(12) United States Patent
Ghule et al.

(10) Patent No.: US 11,570,283 B1
(45) Date of Patent: Jan. 31, 2023

(54) IPV6 EXTENSION HEADER FOR STATELESS HANDLING OF FRAGMENTS IN IPV6

(71) Applicant: Juniper Networks, Inc., Sunnyvale, CA (US)

(72) Inventors: Ashish Suresh Ghule, Bangalore (IN); Swamy Sadashivaiah Renu Kananda, Sunnyvale, CA (US); Jagadish Narasimha Grandhi, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 204 days.

(21) Appl. No.: 16/947,141

(22) Filed: Jul. 20, 2020

(51) Int. Cl.
| | |
|---|---|
| *H04L 69/166* | (2022.01) |
| *H04L 69/22* | (2022.01) |
| *H04L 45/741* | (2022.01) |
| *H04L 9/40* | (2022.01) |

(52) U.S. Cl.
CPC .......... *H04L 69/166* (2013.01); *H04L 45/741* (2013.01); *H04L 63/1483* (2013.01); *H04L 69/22* (2013.01)

(58) Field of Classification Search
CPC ...... H04L 69/166; H04L 45/741; H04L 69/22
See application file for complete search history.

(56) References Cited

U.S. PATENT DOCUMENTS

| | | |
|---|---|---|
| 7,568,224 B1 | 7/2009 | Jennings et al. |
| 10,887,231 B2 | 1/2021 | Ghule et al. |
| 2002/0196797 A1 | 12/2002 | Battin |
| 2004/0064688 A1 | 4/2004 | Jacobs |
| 2004/0088385 A1 | 5/2004 | Blanchet et al. |
| 2004/0107287 A1 | 6/2004 | Ananda et al. |
| 2006/0039379 A1 | 2/2006 | Abe et al. |
| 2007/0195761 A1 | 8/2007 | Tatar et al. |
| 2008/0028467 A1 | 1/2008 | Kommareddy et al. |
| 2009/0110003 A1 | 4/2009 | Julien et al. |
| 2009/0154348 A1 | 6/2009 | Newman |

(Continued)

FOREIGN PATENT DOCUMENTS

| | | |
|---|---|---|
| CN | 101933290 A | 12/2010 |
| CN | 102067569 A | 5/2011 |

(Continued)

OTHER PUBLICATIONS

Xu et al., "Encapsulating IP in UDP; drafl-xu-intarea-ip-in-udp-09," INTAREA Working Group: Internet-Draft, Oct. 17, 2017, 11 pp.

(Continued)

*Primary Examiner* — Samina F Choudhry
(74) *Attorney, Agent, or Firm* — Shumaker & Sieffert, P.A.

(57) ABSTRACT

A network device may receive, from a first network, a network packet of a first network packet type that encapsulates a fragment of a second network packet of a second network packet type, where the network packet includes an extension header that indicates a source port and a destination port for the second network packet. The network device may perform an anti-spoof check on the fragment of the second network packet based at least in part on at least one of: the source port or the destination port for the second network packet that is indicated by the extension header. The network device may, based on the fragment passing the anti-spoof check, forward the fragment of the second network packet to a second network.

19 Claims, 13 Drawing Sheets

(56) References Cited

U.S. PATENT DOCUMENTS

| | | |
|---|---|---|
| 2010/0014459 A1 | 1/2010 | Mir et al. |
| 2010/0046522 A1 | 2/2010 | Tatsumi et al. |
| 2010/0165991 A1 | 7/2010 | Veal et al. |
| 2010/0287227 A1* | 11/2010 | Goel .................... H04L 67/1002 709/202 |
| 2011/0110374 A1 | 5/2011 | Boucadair et al. |
| 2011/0261822 A1 | 10/2011 | Battestilli et al. |
| 2012/0246637 A1 | 9/2012 | Kreeger et al. |
| 2014/0307738 A1 | 10/2014 | Chen et al. |
| 2015/0063166 A1 | 3/2015 | Sif et al. |
| 2015/0201447 A1 | 7/2015 | Li et al. |
| 2015/0281069 A1* | 10/2015 | Brzozowski ............ H04L 45/00 370/392 |
| 2016/0014071 A1 | 1/2016 | Asati et al. |
| 2016/0050140 A1 | 2/2016 | Chinni et al. |
| 2017/0012873 A1 | 1/2017 | Berg |
| 2017/0324849 A1 | 11/2017 | Pfister et al. |
| 2019/0081720 A1* | 3/2019 | Barry ........................ H04J 3/06 |
| 2019/0089735 A1* | 3/2019 | Mattila ............... H04L 61/2007 |
| 2019/0149449 A1 | 5/2019 | Morris |
| 2019/0319924 A1 | 10/2019 | Bouvet et al. |
| 2019/0356591 A1 | 11/2019 | Ghule et al. |
| 2019/0356659 A1 | 11/2019 | Ghule et al. |
| 2020/0128114 A1 | 4/2020 | Kloberdans et al. |
| 2021/0126863 A1 | 4/2021 | Ghule et al. |

FOREIGN PATENT DOCUMENTS

| | | |
|---|---|---|
| CN | 103368853 A | 10/2013 |
| CN | 105900518 A | 8/2016 |

OTHER PUBLICATIONS

Cui et al., "Public IPv4-over-IPv6 Access Network," IETF: RFC 7040, Nov. 2013, 13 pp.

Savola, "MTU and Fragmentation Issues with In-the-Network Tunneling," The Internet Society: RFC 4459, Apr. 2006, 14 pp.

Ziemba et al., "Security Considerations for IP Fragment Filtering," Network Working Group: RFC 1858, Oct. 1995, 10 pp.

Amante et al., "IPv6 Flow Label Specification," Internet Engineering Task Force (IETF), RFC 6437, Nov. 2011, 15 pp.

Carpenter et al., "Using the IPv6 Flow Label for Equal Cost Multipath Routing and Link Aggregation in Tunnels," Internet Engineering Task Force (IETF), RFC 6438, Nov. 2011, 9 pp.

Troan, et al., "Mapping of Address and Port with Encapsulation (MAP-E)," Internet Engineering Task Force (IETF), RFC 7597, Jul. 2015, 35pp.

Despres et al. "IPv4 Residual Deployment via IPv6—A Stateless Solution (4rd)," Internet Engineering Task Force (IETF), RFC 7600, Jul. 2015, 45 pp.

U.S. Appl. No. 16/682,882, filed Nov. 13, 2019, Juniper Networks, Inc. (inventor: Ghule et al.) entitled "Anti-Spoof Check of IPV4-IN-IPV6 Fragments Without Reassembly".

U.S. Appl. No. 16/836,240, filed Mar. 31, 2020, Juniper Networks, Inc. (inventor: Ghule et al.) entitled "IPV6 Flow Label for Stateless Handling of IPV4-Fragments-IN-IPV6".

Afek et al., "Network Anti-Spoofing with SON Data plane", IEEE INFOCOM 2017—IEEE Conference on Computer Communications, May 1, 2017, pp. 1-9.

Aishwarya et al., "Intrusion detection system—An efficient way to thwart against Dos/DDos attack in the cloud environment", 2014 International conference on recent trends in information technology, Apr. 10, 2014, pp. 1-6.

Bremler-Barr et al., "Spoofing Prevention Method", Proceedings IEEE 24th Annual Joint Conference of the IEEE Computer and Communications Societies, vol. 1, Mar. 13, 2005, pp. 536-547.

* cited by examiner

602 — RECEIVE, FROM A FIRST NETWORK, A NETWORK PACKET OF A FIRST NETWORK PACKET TYPE THAT ENCAPSULATES A FRAGMENT OF A SECOND NETWORK PACKET OF A SECOND NETWORK PACKET TYPE, WHEREIN THE NETWORK PACKET IS PART OF A FLOW OF A PLURALITY OF NETWORK PACKETS OF THE FIRST NETWORK PACKET TYPE THAT ENCAPSULATES FRAGMENTS OF THE SECOND NETWORK PACKET, AND WHEREIN THE NETWORK PACKET INCLUDES AN EXTENSION HEADER THAT INDICATES A SOURCE PORT FOR THE SECOND NETWORK PACKET AND A DESTINATION PORT FOR THE SECOND NETWORK PACKET

604 — IN RESPONSE TO RECEIVING THE NETWORK PACKET, PERFORM AN ANTI-SPOOF CHECK ON THE FRAGMENT OF THE SECOND NETWORK PACKET BASED AT LEAST IN PART ON AT LEAST ONE OF: THE SOURCE PORT FOR THE SECOND NETWORK PACKET THAT IS INDICATED BY THE EXTENSION HEADER OR THE DESTINATION PORT FOR THE SECOND NETWORK PACKET

606 — BASED ON THE FRAGMENT OF THE SECOND NETWORK PACKET PASSING THE ANTI-SPOOF CHECK, FORWARD THE FRAGMENT OF THE SECOND NETWORK PACKET TO A SECOND NETWORK

FIG. 6

IPV6 EXTENSION HEADER FOR STATELESS HANDLING OF FRAGMENTS IN IPV6

TECHNICAL FIELD

The disclosure relates to packet-based computer networks and, more particularly, to processing packets within network devices.

BACKGROUND

Internet Protocol version 6 (IPv6) is the successor to Internet Protocol version 4 (IPv4), both of which are versions of the Internet Protocol used for sending and receiving data via networks such as the Internet. IPv6 addresses potential issues with IPv4, such as address exhaustion. Networks have begun to transition from IPv4 to IPv6, and IPv6 networks are being deployed alongside IPv4 networks. One example mechanism for facilitating the transition from IPv4 to IPv6 is Mapping of Address and Port with Encapsulation (MAP-E). MAP-E is a mechanism for transporting IPv4 network packets across an IPv6 network using Internet Protocol (IP) encapsulation to encapsulate IPv4 network packets within IPv6 network packets.

SUMMARY

This disclosure describes techniques for a network device (e.g., a border relay device) to receive, from edge devices via an IPv6 network, IPv6 network packets that encapsulate fragments of an IPv4 network packet and to perform a stateless anti-spoofing check of the fragments of the IPv4 network packet before forwarding the fragments of the IPv4 network packet to an IPv4 network. In particular, aspects of this disclosure describe techniques for perform an anti-spoofing check of the fragments of the IPv4 network packet without reassembling IPv4 network packets from fragments and without buffering the IPv4 network packets. A network device may perform such an anti-spoof check by determining whether the source network address and the source port specified by the IPv4 network packet encapsulated within the IPv6 network packet fall within an acceptable range of values.

However, because each IPv6 network packet includes a different fragment of the IPv4 network packet, typically only a single IPv6 network packet may include the IPv4 network packet fragment having a transport header that specifies information such as the source port for the IPv4 network packet and the destination port for the IPv4 network packet. As such, a network device may receive one or more IPv6 network packets that do not contain the IPv4 network packet fragment that specifies the source port for the IPv4 network packet before it receives the IPv6 network packet that contains the IPv4 network packet fragment that specifies the source port for the IPv4 network packet.

The network device may therefore have to buffer IPv4 network packet fragments that do not specify the source port for the IPv4 network packet until the network device receives an IPv6 network packet that contains the IPv4 network packet fragment that specifies the source port specified by the IPv4 network packet. A network device that performs such buffering of IPv4 network fragments may have to utilize additional memory resources to buffer the IPv4 network fragments and may also have to utilize additional processing resources to keep track of fragments of different IPv4 network packets that it is buffering. For example, the network device may have to keep track of whether, for a flow of fragments of an IPv4 network packet, whether the network device has received a fragment that indicates the source port for the IPv4 network packet.

In accordance with aspects of this disclosure, an edge device that fragments an IPv4 network packet, encapsulates the IPv4 network packet fragments in IPv6 network packets, and sends the IPv6 network packets to the network device may add an indication of the source port specified by the IPv4 network packet and the destination port specified by the IPv4 network packet in each of the IPv6 network packets that encapsulates a fragment of the IPv4 network packet. In particular, the edge device may generate an IPv6 extension header for each of the IPv6 network packets that encapsulate a fragment of the same IPv4 network packet that indicates the source port specified by the IPv4 network packet and the destination port specified by the IPv4 network packet, and may include the IPv6 extension header in each of the IPv6 network packets that encapsulate fragments of the same IPv4 network packet. In this way, each IPv6 network packet may include an extension header that indicates the source port for the IPv4 network packet and the destination port for the IPv4 network packet.

Because the IPv6 extension header in each IPv4-fragment-in-IPv6 packet encodes the source port and the destination port for the IPv4 network packet, the network device may be able to decapsulate and perform an anti-spoof check on each inner IPv4 network packet fragment it receives from the edge device without having to buffer such IPv4 network packet fragments until the network device receives the IPv6 network packet that contains the IPv4 network packet fragment that specifies the source port for the IPv4 network packet. In this way, the techniques described in this disclosure enables a network device to perform stateless handling of IPv4 network packet fragments by enabling the network device to refrain from having to track, for an IPv4 network packet, whether it has already received a fragment of the IPv4 network packet that indicates the source port for the IPv4 network packet.

The techniques described herein may provide certain advantages. For example, the techniques described herein may allow a network device to avoid reassembling the entire IPv4 network packet from the fragments of the IPv4 network packet in order to perform an anti-spoof check on the network packet. Because performing reassembly of IPv4 network packets uses processor and memory resources, refraining from reassembling the IPv4 network packet from the fragments of the IPv4 network packet may enable the network device to perform anti-spoof checks on IPv4 network packets in a way that uses fewer processor and memory resources. This improves the performance of the network device in performing anti-spoof checks on IPv4 network packets, by enabling the network device to increase the speed at which it performs anti-spoof checks on IPv4 network packets while expending less processing resources and using less memory resources to perform such anti-spoof checks.

Similarly, the techniques described herein also allow a network device to avoid buffering or tracking fragments of an IPv4 network packet until the network device receives a fragment of the IPv4 network packet that includes information for the network device to perform an anti-spoof check on the IPv4 network packet. Because buffering fragments of an IPv4 network packet and keeping track of the fragments of an IPv4 network packet buffered at the network device may consume processor and memory resources, the techniques described herein that allow the network device to avoid buffering fragments of an IPv4 network packet may also enable the network device to perform anti-spoof checks on IPv4 network packets in a way that uses fewer processor and memory resources.

In addition, the techniques described herein utilizing an IPv6 extension header to carry the source port and the destination port for an IPv4 network packet may provide other potential advantages. For example, an IPv6 extension header, such as an IPv6 destination options header is able to accommodate both a source port and a destination port, versus other techniques which utilizes fields that are able to carry one of a source port or a destination port. Further, because an IPv6 destination options header without routing information is not processed until the IPv6 network packet reaches its destination, utilizing an IPv6 extension header to carry the source port and the destination port for an IPv4 network packet may increase security by not allowing intermediate nodes to read or modify the IPv6 extension header. In addition, if a network device is not programmed to read the source port or the destination port from an IPv6 extension header, the network device may simply skip reading of the IPv6 extension header, thereby maintaining compatibility with such network devices.

In some examples, the techniques described herein may also be used by a consumer or customer edge (CE) device that is situated between an IPv6 service provider network and one or more IPv4 host devices to perform anti-spoof checks on fragments of IPv4 network packets encapsulated in IPv6 network packets sent from a border relay device via the IPv6 service provider network and to perform destination network address translation (DNAT) on those fragments. In particular, the techniques described herein may also allow the CE device to avoid reassembling the entire IPv4 network packet from the fragments of the IPv4 network packet in order to perform an anti-spoof check and DNAT on fragments of the network packet.

For example, the CE device may receive IPv6 network packets that encapsulate fragments of a IPv4 network packet, where each IPv6 network packet includes an IPv6 extension header that indicates the source port specified by the IPv4 network packet and the destination port specified by the IPv4 network packet. Because the IPv6 extension header in each IPv4-fragment-in-IPv6 packet encodes the source port and the destination port for the IPv4 network packet, the network device may be able to decapsulate and perform an anti-spoof check on each inner IPv4 network packet fragment it receives from the edge device without having to buffer such IPv4 network packet fragments until the network device receives the IPv6 network packet that contains the IPv4 network packet fragment that specifies the destination port for the IPv4 network packet.

In another example, the CE device may receive IPv6 network packets that encapsulate fragments of a IPv4 network packet, where each IPv6 network packet includes a flow label that indicates the destination port specified by the IPv4 network packet. Because the flow label in the encapsulating IPv6 header for each IPv4-fragment-in-IPv6 packet encodes the destination port for the IPv4 network packet, the network device may be able to decapsulate and perform an anti-spoof check on each inner IPv4 network packet fragment it receives from the edge device without having to buffer such IPv4 network packet fragments until the network device receives the IPv6 network packet that contains the IPv4 network packet fragment that specifies the destination port for the IPv4 network packet.

In this way, the techniques described in this disclosure also enables a CE device to perform stateless handling of IPv4 network packet fragments by enabling the CE device to refrain from having to track, for an IPv4 network packet, whether it has already received a fragment of the IPv4 network packet that indicates the destination port for the IPv4 network packet. In addition, the techniques described in this disclosure also enables a CE device to avoid having to reassemble an IPv4 network packet from its fragments in order to determine the destination port for the IPv4 network packet for performing an anti-spoof check on the IPv4 network packet.

In one example, a method includes receiving, by a network device from a first network, a network packet of a first network packet type that encapsulates a fragment of a second network packet of a second network packet type, wherein the network packet is part of a flow of a plurality of network packets of the first network packet type that encapsulates fragments of the second network packet, and wherein the network packet includes an extension header that indicates a source port for the second network packet and a destination port for the second network packet. The method further includes in response to receiving the network packet, performing, by the network device, an anti-spoof check on the fragment of the second network packet based at least in part on at least one of: the source port for the second network packet that is indicated by the extension header or the destination port for the second network packet that is indicated by the extension header. The method further includes based on the fragment of the second network packet passing the anti-spoof check, forwarding, by the network device, the fragment of the second network packet to a second network.

In another example, a network device includes one or more network interfaces configured to receive, from a first network, a network packet of a first network packet type that encapsulates a fragment of a second network packet of a second network packet type, wherein the network packet is part of a flow of a plurality of network packets of the first network packet type that encapsulates fragments of the second network packet, and wherein the network packet includes an extension header that indicates a source port for the second network packet and a destination port for the second network packet; and processing circuitry configured to: in response to receiving the network packet, perform an anti-spoof check on the fragment of the second network packet based at least in part on at least one of: the source port for the second network packet that is indicated by the extension header or the destination port for the second network packet that is indicated by the extension header; wherein the one or more network interfaces are further configured to, based on the fragment of the second network packet passing the anti-spoof check, forward the fragment of the second network packet to a second network.

In another example, a method includes encapsulating, by a network device, a plurality of fragments of a network packet of a second network type with a plurality of network packets of a first network packet type, including creating, for each of the plurality of network packets, an extension header that indicates a source port of the network packet of the second network type and a destination port of the network packet of the second network type. The method further includes forwarding, by the network device, the plurality of network packets to a first network.

In another example, a network device includes processing circuitry configured to encapsulate a plurality of fragments of a network packet of a second network packet type with a plurality of network packets of a first network packet type, including creating, for each of the plurality of network packets, an extension header that indicates a source port of the network packet of the second network packet type and a destination port of the network packet of the second network packet type; and one or more network interfaces configured to forward the plurality of network packets to a first network.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a flowchart illustrating an example process for performing an anti-spoof check on fragments of an IPv4 network packet without buffering fragments of the IPv4 network packet and without reassembling the IPv4 network packet, according to techniques described herein.

DETAILED DESCRIPTION

Figure 1A:
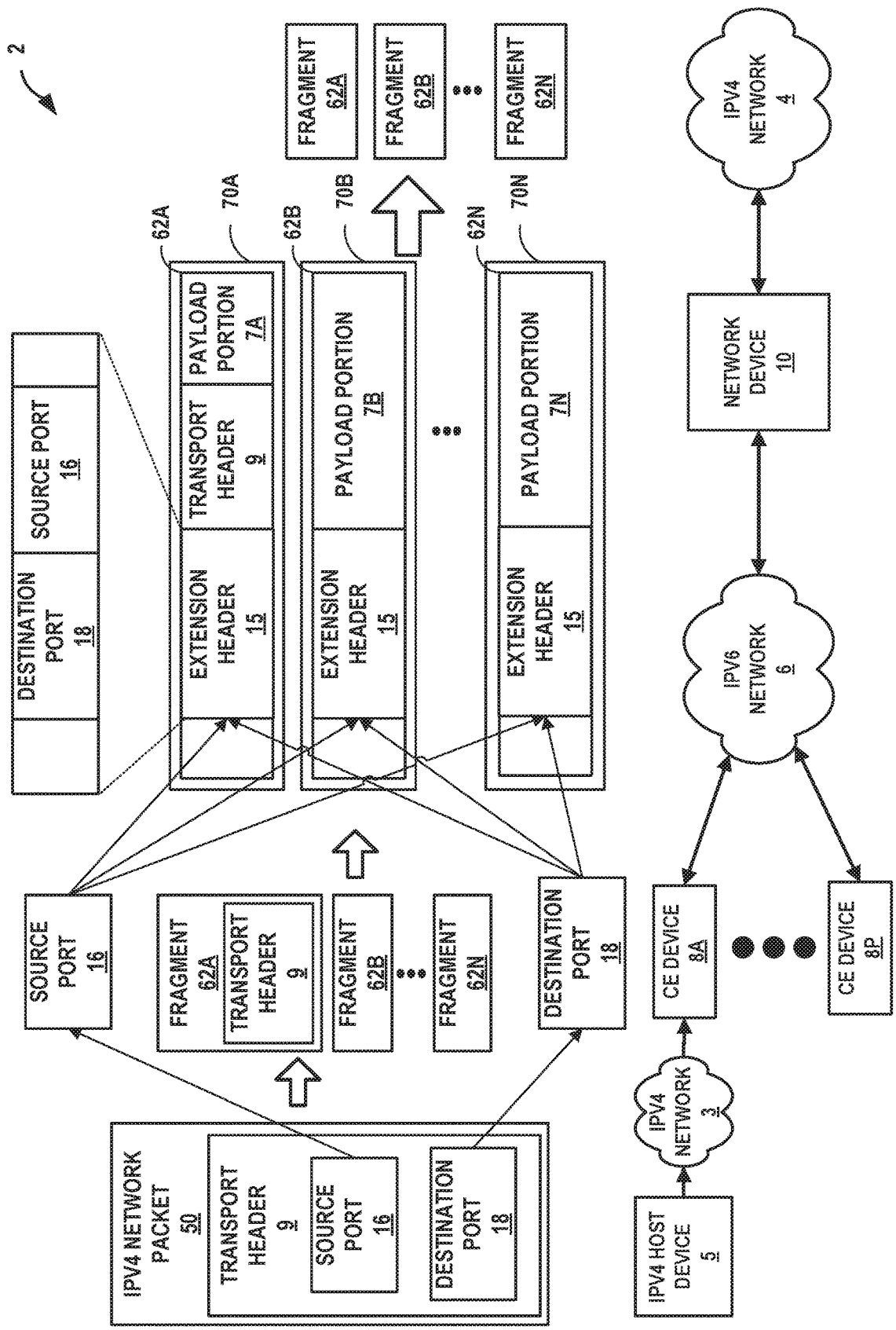
FIGS. 1A-1C is a block diagram illustrating a system in which a network device may connect an IPv6 network to an IPv4 network, according to aspects of the present disclosure.
Figure 1B:
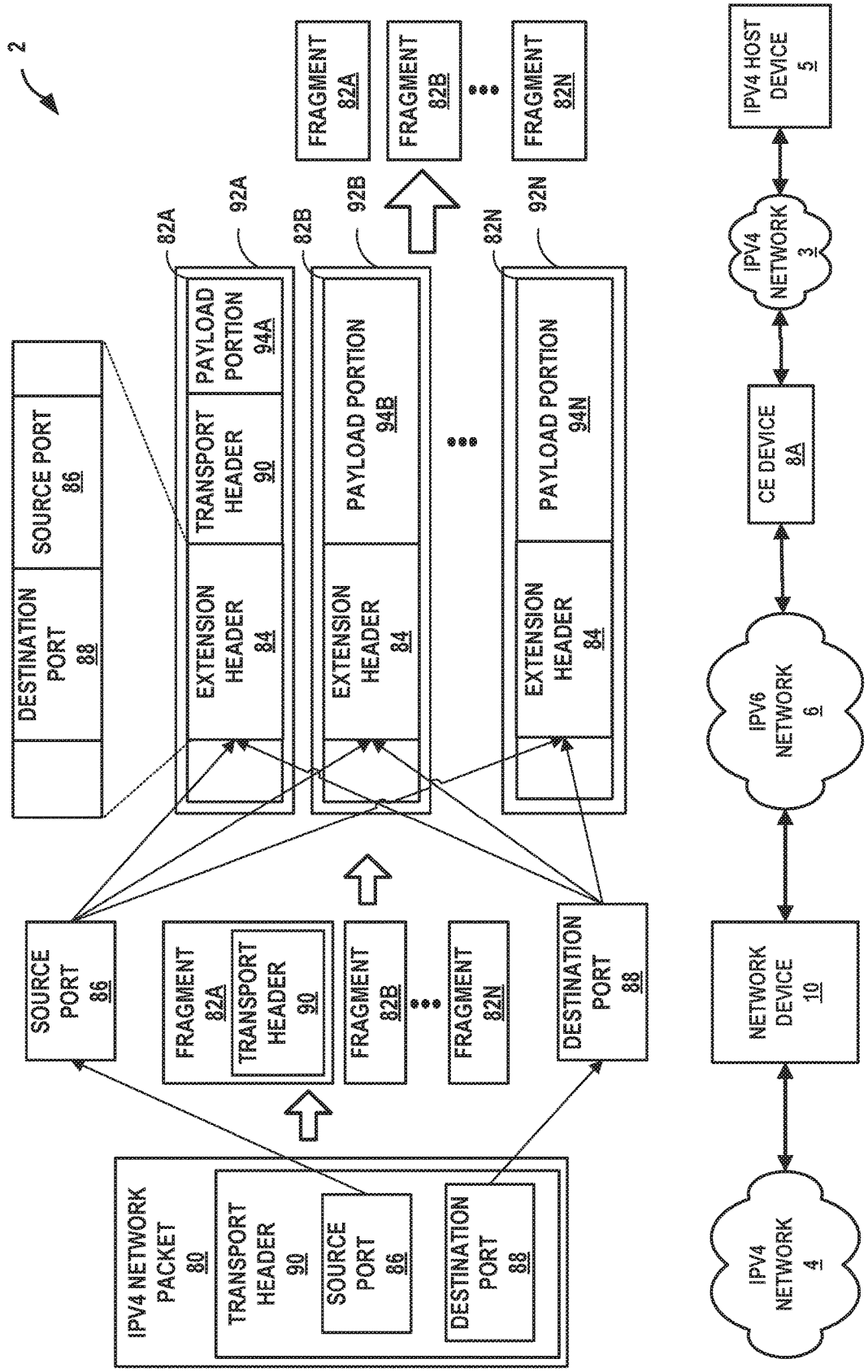
Figure 1C:
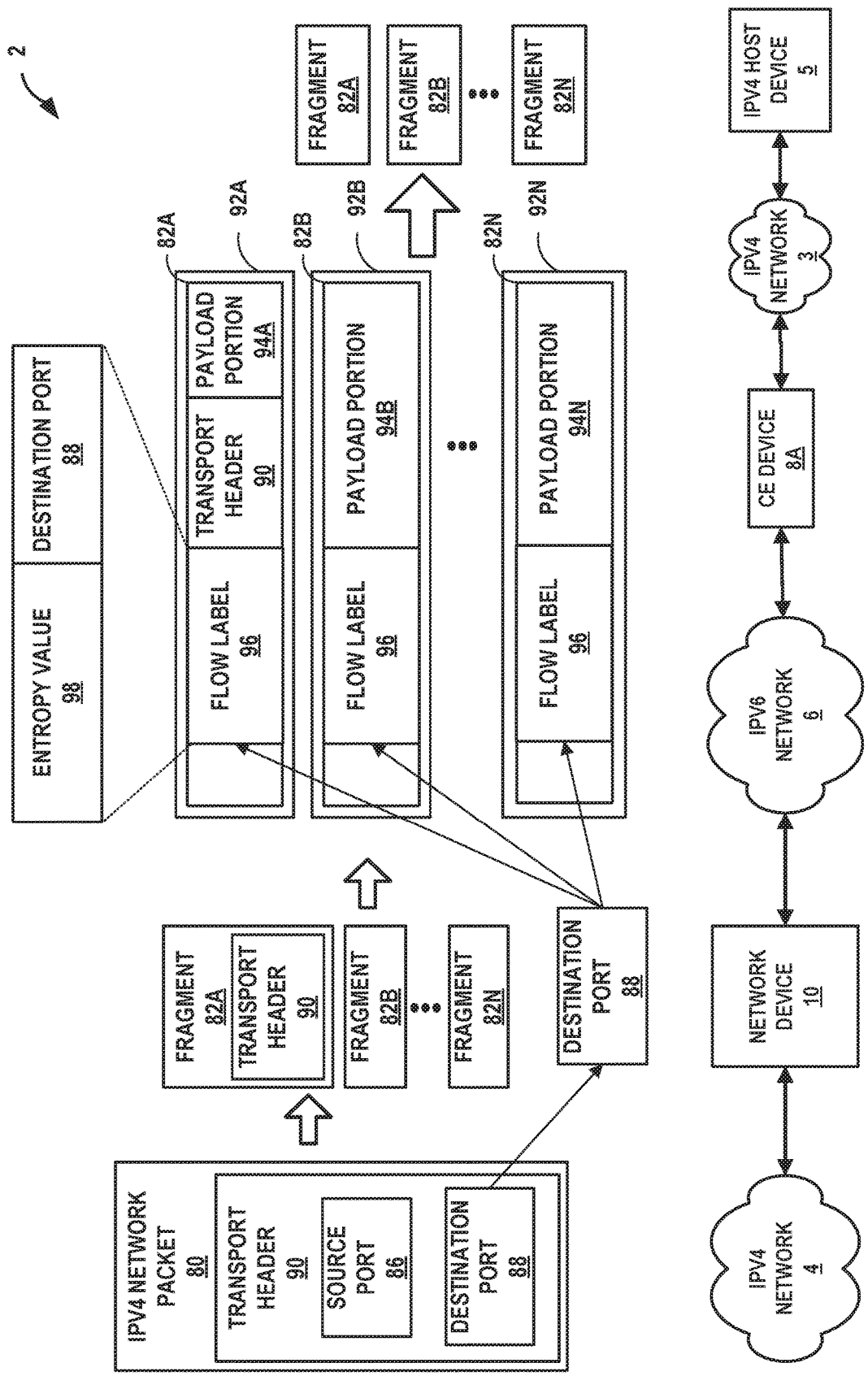

FIGS. 1A-1C are block diagrams illustrating a system 2 in which a network device 10 may connect an IPv6 network 6 to an IPv4 network 4, according to aspects of the present disclosure. Network device 10 may be, for example, a MAP-E enabled router, such as a MAP border relay device that managed by a service provider at the edge of a MAP domain, having at least one IPv6 enabled interface connecting network device 10 to IPv6 network 6, and at least one IPv4 interface connecting network device to IPv4 network 4. In some examples, some or all of system 2 may be part of a service provider network (not shown).

As shown in FIG. 1A, one of consumer or customer edge (CE) devices 8A-8P ("CE devices 8"), such as a customer edge router, may receive, via a private IPv4 network such as IPv4 network 3, an IPv4 network packet 50 from any suitable computing device connected to IPV4 network 3, such as IPv4 host device 5, that is to be forwarded to a public IPv4 network such as IPv4 network 4.

CE devices 8 may connect to IPv4 network 4 via IPv6 network 6 and network device 10 that may be a border relay device for forwarding network packets to IPv4 network 4. As such, in order to forward IPv4 network packet 50 to IPv4 network 4, CE device 8 may have to transmit the IPv4 network packet 50 via IPv6 network 6 to network device 10 by encapsulating an IPv4 network packet 50 within an IPv6 network packet. If the resulting IPv6 network packet from encapsulates IPv4 network packet 50 is larger than a maximum transmission unit (MTU) for IPv6 network 6, CE device 8A, may fragment the IPv4 network packet 50 into fragments 62A-62N, encapsulate the fragments 62A-62N in respective IPv6 network packets 70A-70N, and transmit the IPv6 network packets 70A-70N via IPv6 network 6 to network device 10.

As mentioned throughout this disclosure, the fragments of an IPv4 network packet may make up a fragment flow for the IPv4 network packet. In the example of FIG. 1A, fragments 62A-62N may be a part of a fragment flow for IPv4 network packet 50. Network device 10 may receive, from CE device 8A via IPv6 network 6, the IPv6 network packets 70A-70N containing fragments 62A-62N. Network device 10 may decapsulate fragments 62A-62N from IPv6 network packets 70A-70N and may forward the fragments 62A-62N of IPv4 network packet 50 to IPv4 network 4.

To prevent spoofing of IPv4 addresses, network device 10 may perform an anti-spoof check on each fragment of fragments 62A-62N it receives. If fragments 62A-62N pass the anti-spoofing checks, forward fragments 62A-62N to IPv4 network 4. Conversely, if fragments 62A-62N do not pass the anti-spoofing check, network device 10 may drop fragments 62A-62N or may otherwise refrain from forwarding fragments 62A-62N to IPv4 network 4.

Network device 10 may perform the anti-spoof check of each fragment of fragments 62A-62N based at least in part on the source network address and the source port specified by the IPv4 network packet 50 encapsulated in IPv6 network packets 70A-70N, which is contained in the transport header 9 of the IPv4 network packet 50. As shown in FIG. 1A, IPv4 network packet 50 may include or be associated with transport header 9, also referred to as a transport protocol header, such as a Transport Control Protocol (TCP) header, a User Diagram Protocol (UDP) header, and the like. Transport header 9 may specify source port 16 for IPv4 network packet 50. However, not every fragment of fragments 62A-62N may include the portion of transport header of the IPv4 network packet 50 that specifies source port 16 for the IPv4 network packet 50. Rather, only a single fragment of fragments 62A-62N, such as fragment 62A, may include transport header 9 that specifies source port 16 for the IPv4 network packet 50.

As shown in FIG. 1A, each fragment of fragments 62A-62N may include a different non-overlapping portion of the payload of IPv4 network packet 50. For example, fragment 62A may include IPv4 network packet payload portion 7A, fragment 62B may include and IPv4 network packet payload portion 7B, and fragment 62N may include and IPv4 network packet payload portion 7N. However, only one fragment out of fragments 62A-62N may include the transport header 9 of IPv4 network packet 50. As shown in FIG. 1A, fragment 62A is the only fragment out of fragments 62A-62N that also includes transport header 9, which specifies source port 16 for IPv4 network packet 50 that network device 10 may use to perform the anti-spoof check on fragments 62A-62N.

As such, if network device 10 receives one or more fragments 62 of network packet 50 that do not include transport header 9, network device 10 might not be able to perform anti-spoof checks on the received one or more fragments 62 of IPv4 network packet 50 at least until network device 10 receives a fragment of network packet 50 that includes transport header 9. In one example, in order for network device 10 to perform anti-spoof checks on each fragment of fragments 62A-62N, network device 10 may receive every fragment of fragments 62A-62N and may buffer each of the fragments 62A-62N that it receives. When network device 10 has received every fragment of fragments 62, thereby ensuring that network device 10 has received transport header 9 of IPv4 network packet 50, network device 10 may reassemble IPv4 network packet 50 from fragments 62A-62N and perform an anti-spoof check on the reassembled IPv4 network packet 50 based at least in part on source port 16 specified by transport header 9.

In another example, in order for network device 10 to perform anti-spoof checks on each fragment of fragments 62A-62N, network device 10 may receive and buffer fragments of fragments 62A-62N until it receives a fragment of fragments 62A-62N that includes transport header 9. Once network device 10 receives a fragment of fragments 62A-62N that includes transport header 9, network device 10 may be able to perform anti-spoof checks on the fragments of fragments 62A-62N buffered by network device 10 as well as all other fragments of fragments 62A-62N that network device 10 subsequently receives without reassembling IPv4 network packet 50.

However, buffering fragments 62A-62N may increase use of network device 10's processing and memory resources in order for network device 10 to buffer fragments 62 and to keep track of such buffered fragments. Accordingly, the techniques described herein may enable network device 10 to avoid buffering multiple fragments of an IPv4 network packet in order to perform anti-spoof checks on IPv4 network packets, thereby enabling network device 10 to use fewer processing and memory resources. This improves the performance of the network device 10 in perform anti-spoof checks on IPv4 network packets by enabling the network device 10 to increase the speed at which it performs anti-spoof checks on IPv4 network packets while consuming fewer processing cycles and using fewer memory resources to perform such anti-spoof checks.

In accordance with some aspects of the present disclosure, a CE device, such as CE device 8A, that fragments IPv4 network packet 50 into fragments 62A-62N and encapsulates fragments 62A-62N into IPv6 network packets 70A-70N may create IPv6 network packets 70A-70N so that each IPv6 network packet of IPv6 network packets 70A-70N includes an indication of source port 16 for IPv4 network packet 50. In this way, each time network device 10 receives one of IPv6 network packets 70A-70N that encapsulates an IPv4 network packet 50, network device 10 may be able to perform an anti-spoof check of a fragment of IPv4 network packet 50 encapsulated by the received IPv6 network packet regardless of whether the fragment of IPv4 network packet 50 includes transport header 9 and regardless of whether network device 10 had previously received any fragments of IPv4 network packet 50 that includes transport header 9.

In IPv6, optional internet-layer information may be encoded in one or more separate extension headers that may be placed between the IPv6 header and the upper-layer header, such as the Transmission Control Protocol (TCP) header or User Datagram Protocol (UDP) header, in an IPv6 network packet. Examples of extension headers include hop-by-hop options headers, fragment headers, destination options headers, routing headers, authentication headers, and encapsulating security payload headers, and the like.

CE device 8A may include an indication of source port 16 for IPv4 network packet 50 in each of IPv6 network packets 70A-70N by including an indication of source port 16 for IPv4 network packet 50 in each of extension headers 15A-15N of IPv6 network packets 70A-70N. In some examples, in addition to an indication of source port 16, CE device 8A may also include, in each of extension headers 15A-15N of IPv6 network packets 70A-70N, indications of other parameters or information that may be specified by a single fragment of fragments 62A-62N. For example, transport header 9 of IPv4 network packet 50 may also include a destination port 18 for IPv4 network packet 50 in each of extension headers 15A-15N. As such, in some examples, CE device 8A may also include, in each of extension headers 15A-15N, an indication of the destination port 18 for IPv4 network packet 50 specified by transport header 9.

CE device 8A may send IPv6 network packets 70 that encapsulate fragments 62 of IPv4 network packet 50 via IPv6 network 6 to network device 10, where each IPv6 network packet of IPv6 network packets 70 includes extension header 15. As described above, extension header 15 in each of IPv6 network packets 70 includes an indication of source port 16 for IPv4 network packet. Network device 10 may receive IPv6 network packets 70 sent from CE device 8A in any order, such that the first IPv6 network packet of IPv6 network packets 70 that network device 10 receives might not necessarily contain transport header 9 of IPv4 network packet 50. Nevertheless, because each of IPv6 network packets sent from CE device 8A and received by network device 10 includes extension header 15 that includes an indication of source port 16 of IPv4 network packet 50, network device 10 may be able to perform an anti-spoof check on each IPv6 network packet of IPv6 network packets 70 that it receives regardless of whether the IPv6 network packet of IPv6 network packets 70 that it receives includes transport header 9 of IPv4 network packet 50.

Network device 10 may receive an IPv6 network packet (e.g., IPv6 network packet 70B) of IPv6 network packets 70. Network device 10 may, in response to receiving the IPv6 network packet, decapsulate the fragment (e.g., fragment 62B) of IPv4 network packet 50 encapsulated in the IPv6 network packet and perform an anti-spoof check of the fragment (e.g., fragment 62B) of IPv4 network packet 50 encapsulated in the IPv6 network packet based at least in part on source port 16 for IPv4 network packet 50 that is indicated by extension header 15 of the received IPv6 network packet. Because each of IPv6 network packet 70 includes extension header 15 that indicates source port 16 for IPv4 network packet 50, network device 10 may be able to perform the anti-spoof check of the fragment of IPv4 network packet 50 encapsulated by an IPv6 network packet of IPv6 network packets 70 regardless of whether the fragment includes transport header 9 of IPv4 network packet 50.

To perform the anti-spoof check on a fragment of IPv4 network packet 50 based at least in part on source port 16 for IPv4 network packet 50, network device 10 may determine whether the source network address and the source port of IPv4 network packet 50 as specified by the fragment of IPv4 network packet 50 fall within an acceptable range of values.

To determine the values of acceptable ranges for the source network address and the source port of IPv4 network packet 50, network device 10 may extract an embedded IPv4 network address and a Port Set Identifier (PSID) from the IPv6 source network address of the IPv6 network packet that encapsulates the fragment of IPv4 network packet 50 based on one or more matching Mapping of Address and Port (MAP) rules. The embedded IPv4 network address and the PSID extracted from the IPv6 source network address of the IPv6 network packet may represent the values of acceptable ranges for the source network address and the source port of a fragment of IPv4 network packet 50 encapsulated within an IPv6 network packet.

Each of fragments 62 of IPv4 network packet 50 includes an indication of the source network address of IPv4 network packet 50 and each of IPv6 network packets 70 that encapsulates fragments 62 of IPv4 network packet 50 includes an indication of source port 16 of IPv4 network packet 50 in extension header 15. Thus, network device 10 may be able to perform an anti-spoof check on each fragment of IPv4 network packet 50 it receives by determining whether both the source network address of IPv4 network packet 50 indicated by the fragment of IPv4 network packet 50 and the source port 16 indicated by the IPv6 network packet that encapsulates the fragment of IPv4 network packet 50 fall within an acceptable range of values.

Thus, network device 10 may determine that a fragment of IPv4 network packet 50 passes the anti-spoof check if the source network address of IPv4 network packet 50 indicated by the fragment of IPv4 network packet 50 matches the embedded IPv4 network address extracted from the IPv6 network packet that encapsulates the fragment of IPv4 network packet 50 and if source port 16 of IPv4 network packet 50 in extension header 15 of the IPv6 network packet that encapsulates the fragment of IPv4 network packet 50 falls within a set of ports specified by the PSID. Conversely, network device 10 may determine that the a fragment of IPv4 network packet 50 fails the anti-spoof check if the source network address of IPv4 network packet 50 indicated by the fragment of IPv4 network packet 50 does not match the embedded IPv4 network address extracted from the IPv6 network packet that encapsulates the fragment of IPv4 network packet 50 or if source port 16 of IPv4 network packet 50 in extension header 15 of the IPv6 network packet that encapsulates the fragment of IPv4 network packet 50 does not fall within a set of ports specified by the PSID.

If network device 10 determines that a fragment of IPv4 network packet 50 passes the anti-spoof check, network device 10 may forward the fragment of IPv4 network packet 50 on to IPv4 network 4 without having to buffer the fragment of IPv4 network packet 50 and without having to reassemble IPv4 network packet 50. Conversely, if network device 10 determines that a fragment of IPv4 network packet 50 does not pass the anti-spoof check, network device 10 may refrain from forwarding the fragment of IPv4 network packet 50 on to IPv4 network 4 and may instead drop the fragment of IPv4 network packet 50. In this way, network device 10 may perform anti-spoof checks on fragments of IPv4 network packet 50 without assembling IPv4 network packet 50 from its fragments and without buffering fragments of IPv4 network packet 50 until network device 10 receives a fragment of IPv4 network packet 50 that includes transport header 9.

In the techniques of this disclosure, each extension header in the IPv6 network packets, such as extension header 15 in IPv6 network packets 70, include both an indication of a source port of an IPv4 network packet, such as source port 16 of IPv4 network packet 50 and an indication of a destination port of an IPv4 network packet, such as destination port 18 of IPv4 network packet 50. As described in FIG. 1A, a network device such as network device 10 may perform anti-spoof checks of fragments of an IPv4 network packet using the source port of the IPv4 network packet indicated by the extension header in the IPv6 network packets that encapsulate the fragments of the IPv4 network packet.

In accordance with aspects of the present disclosure, a network device may also use the destination port of a IPv4 network packet to perform anti-spoof checks on fragments of an IPv4 network packet without reassembling the IPv4 network packet and to forward the fragments of the IPv4 network packet to their destination. A border relay device between a public IPv4 network, such as an IPv4 cloud, and a MAP domain, which may encompass an IPv6 tunnel, may receive fragments of an IPv4 network packet. The border relay device may encapsulate each of the fragments of the IPv4 network packet in an IPv6 network packet and may include, in each of the IPv6 network packet, an extension header that includes the destination port of the IPv4 network packet.

The border relay device may send the IPv6 network packets via the IPv6 tunnel to a consumer edge device situated between the IPv6 tunnel and an IPv4 network. As the consumer edge device receives IPv6 network packets that encapsulate fragments of the IPv4 network packet, the consumer edge device may decapsulate the fragments from the IPv6 network packets, perform anti-spoof checks on the fragments based at least in part on the destination port of the IPv4 network packet indicated in the extension headers of the IPv6 network packets, and, for each fragment that passes the anti-spoof check, forward the fragment via an IPv4 network to a host device.

As shown in FIG. 1B, network device 10, which may be a border relay device, may receive fragments 82A-82N of IPv4 network packet 80 from IPv4 network 4 to be forwarded to, e.g., IPv4 host device 5. Each fragment of fragments 82A-82N may include a different non-overlapping portion of the payload of IPv4 network packet 80. For example, fragment 82A may include IPv4 network packet payload portion 94A, fragment 82B may include and IPv4 network packet payload portion 94B, and fragment 82N may include and IPv4 network packet payload portion 94N. However, only one fragment out of fragments 82A-82N may include the transport header 90 of IPv4 network packet 80. As shown in FIG. 1, fragment 82A is the only fragment out of fragments 82A-82N that also includes transport header 90, which specifies destination port 88 for IPv4 network packet 80 that CE device 8A may use to perform the anti-spoof check and destination network address translation (DNAT) on fragments 82A-82N.

As such, if network device 10 receives one or more fragments 82 of network packet 80 that do not include transport header 90, CE device 8A might not be able to perform anti-spoof checks or DNAT on the received one or more fragments 82 of IPv4 network packet 80 at least until CE device 8A receives a fragment of network packet 80 that includes transport header 90. In one example, in order for CE device 8A to perform anti-spoof checks or DNAT on each fragment of fragments 82A-82N, CE device 8A may receive every fragment of fragments 82A-82N and may buffer each of the fragments 82A-82N that it receives. CE device 8A has received every fragment of fragments 82, thereby ensuring that CE device 8A has received transport header 90 of IPv4 network packet 80, CE device 8A may reassemble IPv4 network packet 80 from fragments 82A-82N and perform an anti-spoof check on the reassembled IPv4 network packet 80 and perform DNAT on the reassembled IPv4 network packet 80 based at least in part on destination port 88 specified by transport header 90.

In another example, in order for CE device 8A to perform anti-spoof checks and DNAT on each fragment of fragments 82A-82N, CE device 8A may receive and buffer fragments of fragments 82A-82N until it receives a fragment of fragments 82A-82N that includes transport header 90. Once CE device 8A receives a fragment of fragments 82A-82N that includes transport header 90, CE device 8A may be able to perform anti-spoof checks and DNAT on the fragments of fragments 82A-82N buffered by CE device 8A as well as all other fragments of fragments 82A-82N that CE device 8A subsequently receives without reassembling IPv4 network packet 80.

However, buffering fragments 82A-82N may increase use CE device 8A's processing and memory resources in order for CE device 8A to buffer fragments 82 and to keep track of such buffered fragments. Accordingly, the techniques described herein may enable CE device 8A to avoid buffering multiple fragments of an IPv4 network packet in order to perform anti-spoof checks and DNAT on IPv4 network packets, thereby enabling CE device 8A to use fewer processing and memory resources. This improves the performance of CE device 8A in perform anti-spoof checks and DNAT on IPv4 network packets by enabling CE device 8A to increase the speed at which it performs anti-spoof checks and DNAT on IPv4 network packets while consuming fewer processing cycles and using fewer memory resources to perform such anti-spoof checks.

In accordance with some aspects of the present disclosure, network device 10 may create IPv6 network packets 92A-92N for encapsulating fragments 82A-82N of IPv4 network packet 80 so that each IPv6 network packet of IPv6 network packets 92A-92N includes an indication of destination port 88 for IPv4 network packet 80. In this way, each time CE device 8A receives one of IPv6 network packets 92A-92N that encapsulates an IPv4 network packet 80, CE device 8A may be able to perform an anti-spoof check of a fragment of IPv4 network packet 80 encapsulated by the received IPv6 network packet and DNAT on the fragment regardless of whether the fragment of IPv4 network packet 80 includes transport header 90 and regardless of whether network device 10 had previously received any fragments of IPv4 network packet 80 that includes transport header 90.

Network device may include an indication of destination port 88 for IPv4 network packet 80 in each of IPv6 network packets 92A-92N by including an indication of destination port 88 for IPv4 network packet 80 in each of extension headers 84 of IPv6 network packets 92A-92N. In some examples, in addition to an indication of destination port 88, network device 10 may also include in extension header 84 of each of IPv6 network packets 92A-92N indications of other parameters or information that may be specified by a single fragment of fragments 82A-82N. For example, transport header 90 of IPv4 network packet 80 may also include a source port 86 for IPv4 network packet 80. As such, in some examples, network device 10 may also include in extension header 84 of each of IPv6 network packets 92A-92N an indication of the source port 86 for IPv4 network packet 80 specified by transport header 90.

Network device 10 may send IPv6 network packets 92 that encapsulate fragments 82 of IPv4 network packet 80 via IPv6 network 6 to CE device 8A, where each IPv6 network packet of IPv6 network packets 92 includes extension header 84. As described above, extension header 84 in each of IPv6 network packets 92 includes an indication of destination port 88 for IPv4 network packet 80. CE device 8A may receive IPv6 network packets 92 sent from network device 10 in any order, such that the first IPv6 network packet of IPv6 network packets 92 that CE device 8A receives might not necessarily contain transport header 90 of IPv4 network packet 80. Nevertheless, because each of IPv6 network packets 92 sent from network device 10 and received by CE device 8A includes extension header 84 that includes an indication of destination port 88 of IPv4 network packet 80, CE device 8A may be able to perform an anti-spoof check and DNAT on each fragment of fragments 82 that it receives regardless of whether the IPv6 network packet of IPv6 network packets 92 that it receives includes transport header 90 of IPv4 network packet 80.

CE device 8A may receive an IPv6 network packet (e.g., IPv6 network packet 92B) of IPv6 network packets 92 that encapsulates a fragment (e.g., fragment 82B) of IPv4 network packet 80. CE device 8A may, in response to receiving the IPv6 network packet 92B, decapsulate the fragment 82B and perform an anti-spoof check of the fragment 82B based at least in part on destination port 88 for IPv4 network packet 80 that is indicated by extension header 84 of the received IPv6 network packet 92B. Because each of IPv6 network packets 92 includes extension header 84 that indicates destination port 88 for IPv4 network packet 80, CE device 8A may be able to perform the anti-spoof check of the fragment 82B of IPv4 network packet 80 encapsulated by an IPv6 network packet 92B regardless of whether the fragment 82B includes transport header 90 of IPv4 network packet 80.

To perform the anti-spoof check on a fragment 82B of IPv4 network packet 80 based at least in part on the destination port 88 for IPv4 network packet 80, CE device 8A may determine the destination address of IPv4 network packet 80, which may be contained in fragment 82B, and destination port 88 for IPv4 network packet 80 correspond to destination address of IPv6 network packet 92B, which may be contained in the IPv6 header of IPv6 network packet 92B. For example, CE device 8A may extract an embedded IPv4 network address and a Port Set Identifier (PSID) from the IPv6 destination network address based on one or more matching Mapping of Address and Port (MAP) rules. The embedded IPv4 network address and the PSID extracted from the IPv6 destination network address may represent the values of acceptable ranges for the destination network address and the destination port 88 of IPv4 network packet 80.

Thus, CE device 8A may determine that a fragment (e.g., fragment 82B) of IPv4 network address 80 encapsulated in IPv6 network packet 92B passes the anti-spoof check if the destination network address of IPv4 network address 80 specified by fragment 82B and the destination port 88 of IPv4 network packet 80 specified by extension header 84 in IPv6 network packet 92B are both within the acceptable ranges determined from the IPv6 network address of IPv6 network packet 92B. Conversely, CE device 8A may determine that a fragment (e.g., fragment 82B) of IPv4 network address 80 encapsulated in IPv6 network packet 92B fails the anti-spoof check if the destination network address of IPv4 network address 80 specified by fragment 82B and the destination port 88 of IPv4 network packet 80 specified by extension header 84 in IPv6 network packet 92B are not both within the acceptable ranges determined from the IPv6 network address of IPv6 network packet 92B

If CE device 8A determines that a fragment of IPv4 network packet 80 passes the anti-spoof check, CE device 8A may forward the fragment of IPv4 network packet 80 on to IPv4 network 3 without having to buffer the fragment of IPv4 network packet 80 and without having to reassemble IPv4 network packet 80. For example, if CE device 8A determines that fragment 82B of IPv4 network packet 80 passes the anti-spoof check, CE device 8A may perform DNAT on fragment 82B and forward fragment 82B of IPv4 network packet 80 on to IPv4 network 3. CE device 8A may perform DNAT by performing techniques such as reverse network address port translation to translate the destination network address and the destination port of IPv4 network packet 80 to an IPv4 network address in IPv4 network 3. For example, if fragment 82B of IPv4 network packet 80 passes the anti-spoof check, CE device 8A may determine an IPv4 destination network address in IPv4 network 3 based on the destination network address and the destination port of IPv4 network packet 80, and may forward fragment 82B to a destination, such as IPv4 host device 5 in IPv4 network 3, specified by the IPv4 destination network address.

Conversely, if CE device 8A determines that a fragment of IPv4 network packet 80 does not pass the anti-spoof check, CE device 8A may refrain from forwarding the fragment of IPv4 network packet 80 on to IPv4 network 3. Instead, CE device 8A may instead drop the fragment of IPv4 network packet 80 that does not pass the anti-spoof check. In this way, CE device 8A may perform anti-spoof checks on fragments of IPv4 network packet 80 without assembling IPv4 network packet 80 from its fragments and without buffering fragments of IPv4 network packet 80 until CE device 8A receives a fragment of IPv4 network packet 80 that includes transport header 90.

In some examples, instead of using an extension header to carry the destination port of an IPv4 network packet, some techniques of the present disclosure may instead use the flow label in a flow of packets to carry the destination port of an IPv4 network packet. A flow is a sequence of related packets sent from a particular source to a particular destination. To identify that packets are in the same flow, each packet in the same flow may carry a flow label that is the same for every packet in the same flow. Further, flow labels of packets in different flows may have different values in order to differentiate between packets in different flows.

In the example of FIG. 1C, IPv6 network packets 92A-92N sent from network device 10 to CE device 8A are part of a flow because IPv6 network packets 92A-92N are a sequence of packets that carry fragments 82A-82N of the same IPv4 network packet 80. In order to identify each of IPv6 network packets 92A-92N as being part of the same flow, packets 92A-92N may each include flow label 96 that is the same for each of packets 92A-92N.

Because each of IPv6 network packets 92A-92N includes flow label 96 that identifiers each of IPv6 network packets 92A-92N as being part of the same flow of network packets, and because flow label 96 is the same for each of IPv6 network packets 92A-92N that belong in the same flow, network device 10 may include an indication of destination port 88 for IPv4 network packet 80 in each of IPv6 network packets 92A-92N by including an indication of destination port 88 in flow label 96 that is included in each of IPv6 network packets 92A-92N. To prevent two unrelated flows of network packets from having the same flow label, such as two unrelated flows of IPv6 network packets that encapsulate fragments of IPv4 network packets having the same source port, network device 10 may include entropy value 98 in flow label 96 of IPv6 network packets 92A-92N along with an indication of destination port 88, where entropy value 98 may be a bitwise representation of a random number that is determined by network device 10.

In some examples, flow label 96 may be a 20-bit field, and destination port 88 may be a 16-bit value. As such, network device 10 may create flow label 96 that includes the 16-bit value of destination port 88 as well as 4 bits of entropy value 98. In some examples, network device 10 may create flow label 96 that includes destination port 88 as the sixteen most significant bits of flow label 96 and entropy value 98 as the four least significant bits of flow label 96, while in other examples network device 10 may create flow label 96 that includes destination port 88 as the sixteen least significant bits of flow label 96 and entropy value 98 as the four most significant bits of flow label 96. Network device 10 may also arrange destination port 88 and entropy value 98 in any other fashion in the 20-bit flow label 96, such as by interleaving the bits of destination port 88 with entropy value 98 in any appropriate fashion. For example, network device 10 may create flow label 96 where the most significant two bits of entropy value 98 are the two most significant bits of flow label 96, followed by sixteen bits of destination port 88, followed by the two least significant bits of entropy value 98 as the two least significant bits of flow label 96.

In some examples, network device 10 may encrypt or otherwise obfuscate the value of destination port 88 included in flow label 96. For example, network device 10 may encrypt destination port 88 via any suitable encryption techniques to result in an encrypted destination port that network device 10 may include in flow label 96. In some examples, to encrypt or to obfuscate the value of destination port 88, network device 10 may perform one's complement or two's complement on the value of destination port 88 and may include the resulting value of destination port 88 in flow label 96 along with entropy value 98.

Network device 10 may send IPv6 network packets 92 that encapsulate fragments 82 of IPv4 network packet 80 via IPv6 network 6 to CE device 8A, where each IPv6 network packet of IPv6 network packets 92 includes flow label 96. As described above, flow label 96 in each of IPv6 network packets 92 includes an indication of destination port 88 for IPv4 network packet and entropy value 98. CE device 8A may receive IPv6 network packets 92 sent from network device 10 in any order, such that the first IPv6 network packet of IPv6 network packets 92 that CE device 8A receives might not necessarily contain transport header 9 of IPv4 network packet 80. Nevertheless, because each of IPv6 network packets sent from network device 10 and received by CE device 8A includes flow label 96 that includes an indication of destination port 88 of IPv4 network packet 80, CE device 8A may be able to perform an anti-spoof check and perform DNAT on each IPv6 network packet of IPv6 network packets 92 that it receives regardless of whether the IPv6 network packet of IPv6 network packets 92 that it receives includes transport header 9 of IPv4 network packet 80.

CE device 8A may receive an IPv6 network packet (e.g., IPv6 network packet 92B) of IPv6 network packets 92. CE device 8A may, in response to receiving the IPv6 network packet, decapsulate the fragment (e.g., fragment 82B) of IPv4 network packet 80 encapsulated in the IPv6 network packet and perform an anti-spoof check of the fragment (e.g., fragment 82B) of IPv4 network packet 80 encapsulated in the IPv6 network packet based at least in part on destination port 88 for IPv4 network packet 80 that is indicated by flow label 96 of the received IPv6 network packet. Because each of IPv6 network packet 92 includes flow label 96 that indicates destination port 88 for IPv4 network packet 80, CE device 8A may be able to perform the anti-spoof check of the fragment of IPv4 network packet 80 encapsulated by an IPv6 network packet of IPv6 network packets 92 regardless of whether the fragment includes transport header 9 of IPv4 network packet 80.

To perform the anti-spoof check on a fragment 82B of IPv4 network packet 80 based at least in part on the destination port 88 for IPv4 network packet 80, CE device 8A may determine the destination address of IPv4 network packet 80, which may be contained in fragment 82B, and destination port 88 for IPv4 network packet 80 correspond to destination address of IPv6 network packet 92B, which may be contained in the IPv6 header of IPv6 network packet 92B. For example, CE device 8A may extract an embedded IPv4 network address and a Port Set Identifier (PSID) from the IPv6 destination network address based on one or more matching Mapping of Address and Port (MAP) rules. The embedded IPv4 network address and the PSID extracted from the IPv6 destination network address may represent the values of acceptable ranges for the destination network address and the destination port 88 of IPv4 network packet 80.

Thus, CE device 8A may determine that a fragment (e.g., fragment 82B) of IPv4 network address 80 encapsulated in IPv6 network packet 92B passes the anti-spoof check if the destination network address of IPv4 network address 80 specified by fragment 82B and the destination port 88 of IPv4 network packet 80 specified by extension header 84 in IPv6 network packet 92B are both within the acceptable ranges determined from the IPv6 network address of IPv6 network packet 92B. Conversely, CE device 8A may determine that a fragment (e.g., fragment 82B) of IPv4 network address 80 encapsulated in IPv6 network packet 92B fails the anti-spoof check if the destination network address of IPv4 network address 80 specified by fragment 82B and the destination port 88 of IPv4 network packet 80 specified by extension header 84 in IPv6 network packet 92B are not both within the acceptable ranges determined from the IPv6 network address of IPv6 network packet 92B If CE device 8A determines that a fragment of IPv4 network packet 80 passes the anti-spoof check, CE device 8A may forward the fragment of IPv4 network packet 80 on to IPv4 network 3 without having to buffer the fragment of IPv4 network packet 80 and without having to reassemble IPv4 network packet 80. For example, if CE device 8A determines that fragment 82B of IPv4 network packet 80 passes the anti-spoof check, CE device 8A may perform DNAT on fragment 82B to determine the IPv4 network address for forwarding fragment 82B onto IPv4 network 3 and may forward fragment 82B of IPv4 network packet 80 on to IPv4 network 3. CE device 8A may perform DNAT using techniques such as reverse network address port translation to translate the destination network address and the destination port of IPv4 network packet 80 to an IPv4 network address in IPv4 network 3. For example, if fragment 82B of IPv4 network packet 80 passes the anti-spoof check, CE device 8A may determine an IPv4 destination network address in IPv4 network 3 based on the destination network address and the destination port of IPv4 network packet 80, and may forward fragment 82B to a destination, such as IPv4 host device 5 in IPv4 network 3, specified by the IPv4 destination network address.

Conversely, if CE device 8A determines that a fragment of IPv4 network packet 80 does not pass the anti-spoof check, CE device 8A may refrain from forwarding the fragment of IPv4 network packet 80 on to IPv4 network 3. Instead, CE device 8A may instead drop the fragment of IPv4 network packet 80 that does not pass the anti-spoof check. In this way, CE device 8A may perform anti-spoof checks on fragments of IPv4 network packet 80 without assembling IPv4 network packet 80 from its fragments and without buffering fragments of IPv4 network packet 80 until CE device 8A receives a fragment of IPv4 network packet 80 that includes transport header 90.

While the techniques of FIGS. 1A-1C are described in terms of IPv6 network packets that encapsulate fragments of an IPv4 network packet, the techniques described in this disclosure may be equally applicable to any suitable form of network packet encapsulation, such as IPv6 network packets that encapsulate fragments of IPv6 network packets or IPv6 network packets that encapsulate IPv6 network packets.

Figure 2:
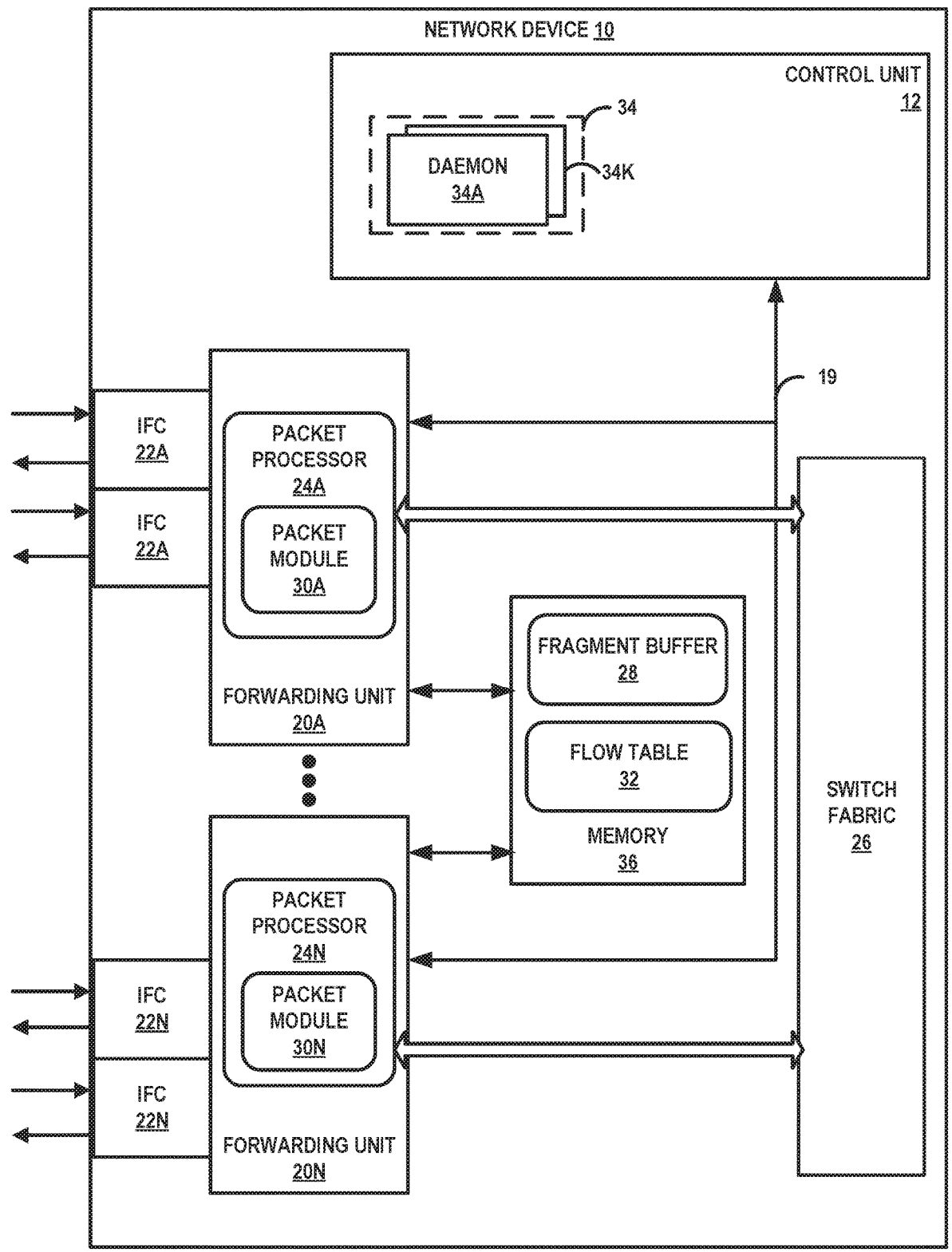
FIG. 2 is a block diagram illustrating an example network device, according to techniques described herein.

FIG. 2 is a block diagram illustrating an example network device 10, according to techniques described herein. Network device 10 may include a router such as a provider edge or customer edge router, a core router, or another type of network device, such as a switch. In some examples, network device is a MAP border relay router, such as a border relay router between an IPv4 cloud and a MAP domain, such as a service provider network. In this example, network device 10 includes a control unit 12 that provides control plane functionality for the device. Network device 10 also includes memory 36, a plurality of forwarding units 20A-20N ("forwarding units 20"), and a switch fabric 26 that together provide a data plane for processing network traffic.

Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. IFCs 22 may be referred to throughout this disclosure as one or more network interfaces. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication links 19. Internal communication links 19 may include a 100 Mbps Ethernet connection, for instance. Control unit 12 configures, by sending instructions and other configuration data via internal communication link 19, forwarding units 20 to define control processing operations applied to packets received by forwarding units 20.

Control unit 12 executes a plurality of applications, including daemons 34A-34K ("daemons 34"). Each of the applications may represent a separate process managed by a control unit operating system. Daemons 34 may represent user-level processes that are developed and deployed by the manufacturer of the network device 10. As such, daemons 34 are "native" to the network device 10 in that the development of the applications is carefully managed by the manufacturer to facilitate secure, robust, and predictable operation of the network device 10, such operation defined at least in part according to a configuration specified by an operator (e.g., a service provider, enterprise, or other customer of the network device 10 manufacturer). Daemons 34 may run network management software, execute routing protocols to communicate with peer routing devices, maintain and update one or more routing tables, and create one or more forwarding tables for installation to forwarding units 20, among other functions.

Control unit 12 may include processing circuitry (not shown in FIG. 2) that execute software instructions, such as those used to define a software or computer program, stored to a computer-readable storage medium, such as memory 36, which may be non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the processing circuitry to perform techniques described herein.

Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 may be operably coupled to memory 36 that stores fragment buffer 28 and flow table 32 that are shared by the forwarding units of forwarding units 20. Memory 36, fragment buffer 28, and flow table 32 may be external to forwarding units 20, and may reside in the forwarding plane of network device 10 (as shown in FIG. 2), or memory 36, fragment buffer 28, and flow table 32 may be part of control unit 12 in the control plane of network device 10. In some examples, each of forwarding units 20 accesses memory 36 via switch fabric 26, rather than being directly coupled to memory 36 as shown in FIG. 2. In these examples, fragment buffer 28 and flow table 32 are shared across the multiple forwarding units 20, such that each of the packet modules 30 are concurrently accessing the same flow table 32 and a common pool of fragment buffers 28.

Flow table 32 may store information regarding fragments of network packets encountered by network device 10, such as via IFCs 22, and may include entries associated with network packets encountered by network device 10. Each entry in flow table 32 may be associated with a different network packet encountered by network device 10, such that each entry in flow table 32 may contains information about fragments of the network packet associate with the entry in flow table 32.

Fragment buffer 28 may store fragments of network packets, such as fragments of IPv4 network packets on which network device 10 may perform one or more operations. For example, fragment buffer 28 may store fragments received by any of IFCs 22. Similarly, a packet processor such as packet processor 24A of forwarding unit 20A may perform one or more operations on the fragments stored in fragment buffer 28 and may output the fragments stored in fragment buffer 28 via IFC 22A. In some examples, fragment buffer 28 may be reassembly buffers of network device 10 that has typically been used by network device 10 to store fragments of IPv4 network packets that network device 10 may reassemble in order to perform an anti-spoof check on the IPv4 network packet. The techniques disclosed in this disclosure may be able to perform one or more operations on fragments of IPv4 network packets received by network device 10, such as anti-spoof checks, without storing the fragments of IPv4 network packets in fragment buffer 28 and without reassembling an IPv4 network packet from its fragments.

Each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. The result of packet processing determines the manner in which a packet is forwarded or otherwise processed by packet processors 24 of forwarding units 20 from its input interface on one of IFCs 22 to, at least in some cases, its output interface on one of IFCs 22.

Packet processors 24 include respective packet modules 30A-30N ("packet module 30") that execute at packet processors 24 to receive, via IFCs 22 from IPv6 network 6, IPv6 network packets 70 that encapsulate fragments 62 of IPv4 network packet 50. Each of IPv6 network packets 70 may encapsulate a fragment of IPv4 network packet 50 that is to be forwarded to IPv4 network 4. Packet module 30 may perform an anti-spoof check on each fragment of IPv4 network packet 50 that it receives. If the fragment of IPv4 network packet 50 pass the anti-spoof check, packet module 30 may forward the fragment of IPv4 network packet 50 to IPv4 network 4. If the fragment of IPv4 network packet 50 fails the anti-spoof check, packet module 30 may drop the fragment of IPv4 network packet 50.

Packet module 30 may perform the anti-spoof checks when anti-spoof check is enabled in packet module 30. If anti-spoof check is not enabled, packet module 30 may decapsulate and forward each fragment of IPv4 network packet 50 that it receives to IPv4 network 4 without performing the anti-spoof check.

Packet module 30 may perform an anti-spoof check on a fragment of IPv4 network packet 50 based at least in part on the IPv4 source network address of IPv4 network packet 50 and the source port of IPv4 network packet 50 indicated by the IPv6 network packet that encapsulates the fragment of IPv4 network packet 50. In particular, packet module may perform an anti-spoof check on the fragment of IPv4 network packet 50 by determining whether the IPv4 source network address and the source port of IPv4 network packet 50 indicated by the IPv6 network packet that encapsulates the fragment of IPv4 network packet 50 are each within a respective acceptable range. If the IPv4 source network address and the source port indicated by the IPv6 network packet that encapsulates the fragment of IPv4 network packet 50 are each within a respective acceptable range, then the fragment of IPv4 network packet 50 passes the anti-spoof check. However, if at least one of the IPv4 source network address or the source port is not within a respective acceptable range, then the fragment of IPv4 network packet 50 fails the anti-spoof check.

To perform the anti-spoof check on a fragment of IPv4 network packet 50 based at least in part on source port 16 for IPv4 network packet 50, network device 10 may determine whether the source network address and the source port of IPv4 network packet 50 as specified by the fragment of IPv4 network packet 50 fall within an acceptable range of values. To determine the values of acceptable ranges for the source network address and the source port of IPv4 network packet 50, packet module 30 may extract an embedded IPv4 network address and a Port Set Identifier (PSID) from the IPv6 source network address of the IPv6 network packet that encapsulates the fragment of IPv4 network packet 50 based on one or more matching Mapping of Address and Port (MAP) rules. The embedded IPv4 network address and the PSID extracted from the IPv6 source network address of the IPv6 network packet may represent the values of acceptable ranges for the source network address and the source port of the fragment of IPv4 network packet 50 encapsulated within an IPv6 network packet.

Each of fragments 62 of IPv4 network packet 50 includes an indication of the source network address of IPv4 network packet 50 and each of IPv6 network packets 70 that encapsulates fragments 62 of IPv4 network packet 50 includes an indication of source port 16 of IPv4 network packet 50 and destination port 18 in extension header 15. Thus, packet module 30 may be able to perform an anti-spoof check on each fragment of IPv4 network packet 50 that network device 10 receives by determining whether both the source network address of IPv4 network packet 50 indicated by the fragment of IPv4 network packet 50 and the source port 16 indicated by the IPv6 network packet that encapsulates the fragment of IPv4 network packet 50 fall within an acceptable range of values.

Thus, packet module 30 may determine that a fragment of IPv4 network packet 50 passes the anti-spoof check if the source network address of IPv4 network packet 50 indicated by the fragment of IPv4 network packet 50 matches the embedded IPv4 network address extracted from the IPv6 network packet that encapsulates the fragment of IPv4 network packet 50 and if source port 16 of IPv4 network packet 50 in extension header 15 of the IPv6 network packet that encapsulates the fragment of IPv4 network packet 50 falls within a set of ports specified by the PSID. Conversely, packet module 30 may determine that the a fragment of IPv4 network packet 50 fails the anti-spoof check if the source network address of IPv4 network packet 50 indicated by the fragment of IPv4 network packet 50 does not match the embedded IPv4 network address extracted from the IPv6 network packet that encapsulates the fragment of IPv4 network packet 50 or if source port 16 of IPv4 network packet 50 in extension header 15 of the IPv6 network packet that encapsulates the fragment of IPv4 network packet 50 does not fall within a set of ports specified by the PSID.

If packet module 30 determines that a fragment of IPv4 network packet 50 passes the anti-spoof check, network device 10 may forward the fragment of IPv4 network packet 50 on to IPv4 network 4 via IFCs 22 without having to buffer the fragment of IPv4 network packet 50 and without having to reassemble IPv4 network packet 50. Conversely, if packet module 30 determines that a fragment of IPv4 network packet 50 does not pass the anti-spoof check, network device 10 may refrain from forwarding the fragment of IPv4 network packet 50 on to IPv4 network 4 and may instead drop the fragment of IPv4 network packet 50. In this way, network device 10 may perform anti-spoof checks on fragments of IPv4 network packet 50 without assembling IPv4 network packet 50 from its fragments and without buffering fragments of IPv4 network packet 50 until network device 10 receives a fragment of IPv4 network packet 50 that includes transport header 9.

In some examples, packet module 30 may execute at packet processors 24 to receive, via IFCs 22 from IPv4 network 4, fragments 82A-82N of IPv4 network packet 80 that is to be forwarded through a MAP domain to an IPv4 host device, such as IPv4 host device 5.

Because forwarding fragments of a network packet through a MAP domain includes forwarding the fragments of the network packet through IPv4 network 6, packet module 30 may execute to encapsulate fragments 82 in IPv6 network packets 92.

In some examples, because only one fragment of fragments 82 may include transport header 90 that specifies source port 86 of IPv4 network packet 80 and destination port 88 of IPv4 network packet 80, packet module 30 may execute to create extension header 84 for IPv6 network packets 92 that indicates source port 86 of IPv4 network packet 80 and destination port 88 of IPv4 network packet 80, and may execute to include extension header 84 in each of IPv6 network packets 92.

To create extension header 84 that includes an indication of source port 86 of IPv4 network packet 80 and destination port 88 of IPv4 network packet 80, packet module 30 may execute to determine the value of source port 86 of IPv4 network packet 80 and destination port 88 of IPv4 network packet 80, such as from transport header 90 of IPv4 network packet 80. Packet module 30 may therefore execute to create extension header 84 that includes an indication of source port 86 of IPv4 network packet 80 and destination port 88 of IPv4 network packet 80.

Because each of IPv6 network packets 92 includes extension header 84 that includes an indication of source port 86 of IPv4 network packet 80 and destination port 88 of IPv4 network packet 80, each respective IPv6 network packet of IPv6 network packets 92 may include or otherwise specify all of the information for performing an anti-spoof check on fragments 82 encapsulated in IPv6 network packet 92.

Network device 10 may forward IPv6 network packets 92 that encapsulate fragments 82 of IPv4 network packet 80 to CE device 8A via IPv6 network 6, such as via one or more IFCs 22. For example, in response to encapsulating a fragment 82B of IPv4 network packet 80 in IPv6 network packet 92B, packet module 30 may execute to send IPv6 network packet 92B to CE device 8A via IPv6 network 6. CE device 8A may receive IPv6 network packet 92B. CE device 8A may, in response to receiving IPv6 network packet 92B, decapsulate fragment 82B of IPv4 network packet 80 from IPv6 network packet 92B and may perform an anti-spoof check on fragment 82B of IPv4 network packet 80 based at least in part on source port 86 of IPv4 network packet 80 and/or destination port 88 of IPv4 network packet 80 that is indicated by extension header 84 of IPv6 network packet 92B.

In some examples, because IPv6 network packets 92 encapsulate fragments 82 of the same IPv4 network packet 80, packet module 30 may execute to create flow label 96 for IPv6 network packets 92 to indicate that each of IPv6 network packets 92 are part of the same flow of IPv6 network packets 92. Further, because only one fragment of fragments 82 may include transport header 90 that specifies destination port 88 of IPv4 network packet 80, packet module 30 may execute to create flow label 96 for IPv6 network packets 92 that indicates destination port 88 of IPv4 network packet 80 whose fragments 82 are encapsulated by IPv6 network packets 92, and may execute to include flow label 96 in each of IPv6 network packets 92.

To create flow label 96 that includes an indication of destination port 88 of IPv4 network packet 80, packet module 30 may execute to determine the value of destination port 88 for IPv4 network packet 80, such as from transport header 90 of IPv4 network packet 80. Packet module 30 may therefore execute to create flow label 96 to include an indication of destination port 88 for IPv4 network packet 80 as well as entropy value 98. Packet module 30 may execute to include entropy value 98 in flow label 96 in order to prevent different flows of network packets from sharing the same flow field, thereby ensuring that different flows of fragments have different flow labels. In some examples, packet module 30 may execute to generate the entropy value by generating a random number as the entropy value.

In some examples, example, if flow label 96 is a 20-bit value, and if the value of destination port 88 for IPv4 network packet 80 is a 16-bit value, packet module 30 may execute to generate a 20-bit flow label 96 that includes the 16-bit destination port 88 for IPv4 network packet 80 and a 4-bit entropy value 98. Packet module 30 may execute to arrange the bitwise values of destination port 88 and entropy value 98 in any suitable arrangement. For example, packet module 30 may execute to create flow label 96 that includes destination port 88 as the sixteen most significant bits of flow label 96 and entropy value 98 as the four least significant bits of flow label 96, while in other examples packet module 30 may execute to create flow label 96 that includes destination port 88 as the sixteen least significant bits of flow label 96 and entropy value 98 as the four most significant bits of flow label 96. In some examples, packet module 30 may execute to create flow label 96 in which the bits of destination port 88 and entropy value 98 are interleaved, such as when the most significant two bits of entropy value 98 are the two most significant bits of flow label 96, followed by sixteen bits of destination port 88, followed by the two least significant bits of entropy value 98 as the two least significant bits of flow label 96.

In some examples, packet module 30 may execute to encrypt or otherwise obfuscate the value of destination port 88 included in flow label 96. For example, packet module 30 may execute to encrypt destination port 88 via any suitable encryption techniques to result in an encrypted destination port that packet module 30 may execute to include in flow label 96. In some examples, to encrypt or to obfuscate the value of destination port 88, packet module 30 may execute to perform one's complement or two's complement on the value of destination port 88 to generate an encrypted destination port or an obfuscated destination port and may include the resulting value of performing one's complement or two's complement on the value of destination port 88 in flow label 96 along with entropy value 98.

In this way, packet module 30 may execute to create flow label 96 that indicates destination port 88 of IPv4 network packet 80 and is the same for each of IPv6 network packets 92 to identify IPv6 network packets 92 as being part of the same flow of network packets. Because each of IPv6 network packets 92 includes flow label 96 that indicates destination port 88 of IPv4 network packet 80, each respective IPv6 network packet of IPv6 network packets 92 may include or otherwise specify all of the information for performing an anti-spoof check on the respective IPv6 network packet.

Network device 10 may forward IPv6 network packets 92 that encapsulate fragments 82 of IPv4 network packet 80 via IPv6 network 6 to CE device 8A, such as via one or more IFCs 22. For example, in response to encapsulating a fragment 82B of IPv4 network packet 80 in IPv6 network packet 92B, packet module 30 may execute to send IPv6 network packet 92B to CE device 8A. CE device 8A may receive in IPv6 network packet 92B and may, in response, decapsulate fragment 82B of IPv4 network packet 80 from IPv6 network packet 92B and may perform an anti-spoof check on fragment 82B of IPv4 network packet 80 based at least in part on destination port 88 of IPv4 network packet 80 that is indicated by flow label 96 of IPv6 network packet 92.

Figure 3:
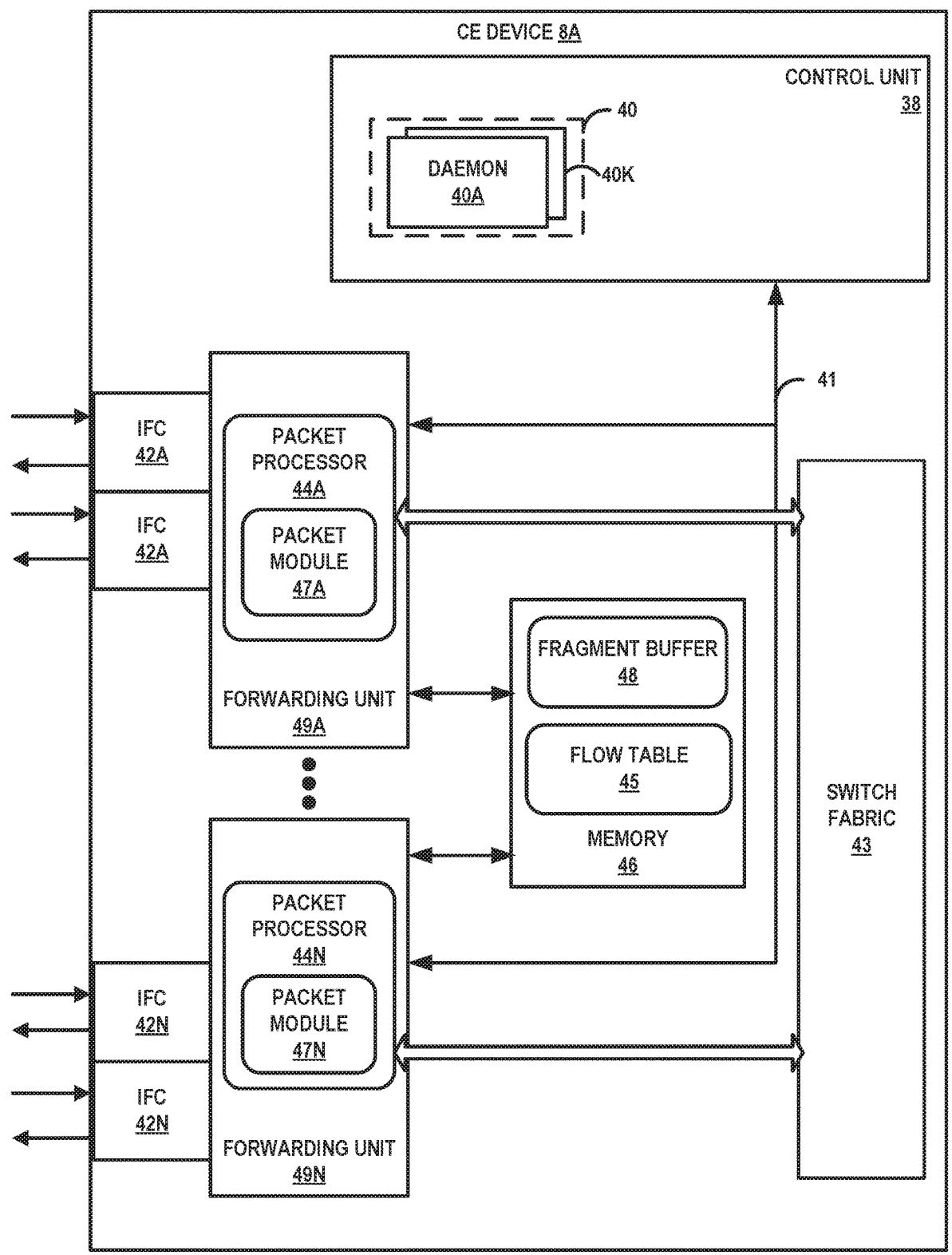
FIG. 3 is a block diagram illustrating an example consumer or customer edge device, according to techniques described herein.

FIG. 3 is a block diagram illustrating an example consumer edge (CE) device 8A, according to techniques described herein. In this example, CE device 8A includes a control unit 38 that provides control plane functionality for the device. CE device 8A also includes memory 46, a plurality of forwarding units 49A-49N ("forwarding units 49"), and a switch fabric 43 that together provide a data plane for processing network traffic.

Forwarding units 49 receive and send data packets via interfaces of interface cards 42A-42N ("IFCs 42") each associated with a respective one of forwarding units 49. Each of forwarding units 49 and its associated ones of IFCs 42 may represent a separate line card insertable within a chassis (not shown) of CE device 8A. IFCs 42 may be referred to throughout this disclosure as one or more network interfaces. Example line cards include flexible programmable integrated circuit (PIC) concentrators (FPCs), dense port concentrators (DPCs), and modular port concentrators (MPCs). Each of IFCs 42 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 49 may include more or fewer IFCs. Switch fabric 43 provides a high-speed interconnect among forwarding units 49 for forwarding incoming data packets to an egress forwarding unit of forwarding units 49 for output over a network that includes network device 10.

Control unit 38 is connected to each of forwarding units 49 by internal communication links 41. Internal communication links 41 may include a 100 Mbps Ethernet connection, for instance. Control unit 38 configures, by sending instructions and other configuration data via internal communication link 41, forwarding units 49 to define control processing operations applied to packets received by forwarding units 49.

Control unit 38 executes a plurality of applications, including daemons 40A-40K ("daemons 40"). Each of the applications may represent a separate process managed by a control unit operating system. Daemons 40 may represent user-level processes that are developed and deployed by the manufacturer of CE device 8A. As such, daemons 40 are "native" to CE device 8A in that the development of the applications is carefully managed by the manufacturer to facilitate secure, robust, and predictable operation of the network device 10, such operation defined at least in part according to a configuration specified by an operator (e.g., a service provider, enterprise, or other customer of CE device 8A's manufacturer). Daemons 40 may run network management software, execute routing protocols to communicate with peer routing devices, maintain and update one or more routing tables, and create one or more forwarding tables for installation to forwarding units 49, among other functions.

Control unit 38 may include processing circuitry (not shown in FIG. 3) that executes software instructions, such as those used to define a software or computer program, stored to a computer-readable storage medium, such as memory 46, which may be non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the processing circuitry to perform techniques described herein.

Alternatively, or in addition, control unit 38 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 49 may be operably coupled to memory 46 that stores fragment buffer 48 and flow table 45 that are shared by the forwarding units of forwarding units 49. Memory 46, fragment buffer 48, and flow table 45 may be external to forwarding units 49, and may reside in the forwarding plane of network device 10 (as shown in FIG. 2), or memory 46, fragment buffer 48, and flow table 45 may be part of control unit 38 in the control plane of CE device 8A. In some examples, each of forwarding units 49 accesses memory 46 via switch fabric 43, rather than being directly coupled to memory 46 as shown in FIG. 3. In these examples, fragment buffer 48 and flow table 45 are shared across the multiple forwarding units 49, such that each of the packet modules 47 are concurrently accessing the same flow table 45 and a common pool of fragment buffers 48.

Flow table 45 may store information regarding flows of network packets created or encountered by CE device 8A. For example, flow table 45 may store information regarding a flow of IPv6 network packets 92 that encapsulates fragments 82 of IPv4 network packet 80, such as information regarding flow label 96 of the flow of IPv6 network packets 92, entropy value 98 that are to be included in flow label 96 of the flow of IPv6 network packets 92, and the like. Each entry in flow table 45 may be associated with a different network packet encountered by CE device 8A, such that each entry in flow table 45 may contains information about fragments of the network packet associate with the entry in flow table 45.

Fragment buffer 48 may store fragments of network packets, such as fragments of IPv4 network packets. For example, CE device 8A may fragment IPv4 network packet 50 that it receives via any of IFCs 42 into fragments 62 and may store fragments 62 of IPv4 network packet 50 into fragment buffer 48 for further processing. For example, CE device 8A may encapsulate such fragments 62 of IPv4 network packet 50 stored fragment buffer 48 according to the techniques described herein.

Each forwarding unit of forwarding units 49 includes at least one packet processor 44 that processes packets by performing a series of operations on each packet over respective internal packet forwarding paths as the packets traverse the internal architecture of network device 10. Packet processor 44A of forwarding unit 49A, for instance, includes one or more configurable hardware chips (e.g., a chipset) that, when configured by applications executing on control unit 38, define the operations to be performed by packets received by forwarding unit 49. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 49 may include one or more packet processors 44.

Operations may be performed, for example, on each packet by any of a corresponding ingress interface, an ingress forwarding unit 49, an egress forwarding unit 49, an egress interface or other components of CE device 8A to which the packet is directed prior to egress, such as one or more service cards. Packet processors 44 process packets to identify packet properties and perform actions bound to the properties. Each of packet processors 44 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. The result of packet processing determines the manner in which a packet is forwarded or otherwise processed by packet processors 44 of forwarding units 49 from its input interface on one of IFCs 42 to, at least in some cases, its output interface on one of IFCs 42.

Packet processors 44 include respective packet modules 47A-47N ("packet module 47") that execute at packet processors 44 to receive, via IFCs 42 from IPv4 network 3, IPv4 network packet 50. Packet module 47 may execute to fragment IPv4 network packet 50 into fragments 62 and may execute to encapsulate fragments 62 in IPv6 network packets 70.

Because only one fragment of fragments 62 may include transport header 9 that specifies source port 16 of IPv4 network packet 50 and destination port 18 of IPv4 network packet 50, packet module 47 may execute to create extension header 15 for IPv6 network packets 70 that indicates source port 16 of IPv4 network packet 50 and destination port 18 of network packet 50, and may execute to include extension header 15 in each of IPv6 network packets 70.

To create extension header 15 (see FIG. 1A) that includes an indication of source port 16 of IPv4 network packet 50, packet module 47 may execute to determine the value of source port 16 for IPv4 network packet 50 and destination port 18 for IPv4 network packet 50, such as from transport header 9 of IPv4 network packet 50. Packet module 47 may therefore execute to create extension header 15 to include an indication of source port 16 for IPv4 network packet 50 and destination port 18 for IPv4 network packet 50. Because each of IPv6 network packets 70 includes extension header 15 that indicates source port 16 of IPv4 network packet 50 and destination port 18 for IPv4 network packet 50, each respective IPv6 network packet of IPv6 network packets 70 may include or otherwise specify all of the information for performing an anti-spoof check on the respective IPv6 network packet.

CE device 8A may forward IPv6 network packets 70 that encapsulate fragments 62 of IPv4 network packet 50 to network device 10, such as via one or more IFCs 42. For example, in response to encapsulating a fragment 62B of IPv4 network packet 50 in IPv6 network packet 70B, packet module 47 may execute to send IPv6 network packet 70B to network device 10. Network device 10 may receive in IPv6 network packet 70B and may, in response, decapsulate fragment 62B of IPv4 network packet 50 from IPv6 network packet 70B and may perform an anti-spoof check on fragment 62B of IPv4 network packet 50 based at least in part on source port 16 of IPv4 network packet 50 that is indicated by extension header 15 of IPv6 network packet 70.

In some examples, CE device 8A may receive via IFCs 42 from IPv6 network 6, IPv6 network packets 92 that encapsulate fragments 82 of IPv4 network packet 80 that are to be forwarded via IPv4 network 3 to IPv4 host device 5. Packet module 47 may perform an anti-spoof check on each fragment of IPv4 network packet 80 that it receives. If the fragment of IPv4 network packet 80 pass the anti-spoof check, packet module 47 may forward the fragment of IPv4 network packet 80 to IPv4 host device 5 via IPv4 network 3. If the fragment of IPv4 network packet 80 fails the anti-spoof check, packet module 47 may drop the fragment of IPv4 network packet 80.

Packet module 47 may perform the anti-spoof checks when anti-spoof check is enabled in packet module 47. If anti-spoof check is not enabled, packet module 47 may decapsulate and forward each fragment of IPv4 network packet 80 that it receives to IPv4 host device 5 without performing the anti-spoof check.

Packet module 47 may perform an anti-spoof check on a fragment of IPv4 network packet 80 based at least in part on the IPv4 destination network address of IPv4 network packet 80. In particular, packet module may perform an anti-spoof check on the fragment of IPv4 network packet 80 by determining whether the IPv4 destination network address and the destination port 88 of IPv4 network packet 80 are each within a respective acceptable range, based on the IPv6 destination network address of the IPv6 network packet that encapsulates the fragment. To determine the values of acceptable ranges for the destination network address and the destination port 88 of IPv4 network packet 80, packet module 47 may extract an embedded IPv4 network address and a Port Set Identifier (PSID) from the IPv6 destination network address of the IPv6 network packet that encapsulates the fragment of IPv4 network packet 80 based on one or more matching Mapping of Address and Port (MAP) rules. The embedded IPv4 network address and the PSID extracted from the IPv6 destination network address of the IPv6 network packet may represent the values of acceptable ranges for the destination network address for IPv4 network pack 80 and the destination port 88 of the fragment of IPv4 network packet 80 encapsulated within an IPv6 network packet. If the IPv4 destination network address and the destination port 88 of IPv4 network packet 80 are each within a respective acceptable range, then the fragment of IPv4 network packet 80 passes the anti-spoof check. However, if at least one of the IPv4 destination network address or the destination port 88 of IPv4 network packet 80 is not within a respective acceptable range, then the fragment of IPv4 network packet 80 fails the anti-spoof check.

Each of fragments 82 of IPv4 network packet 80 includes an indication of the destination network address of IPv4 network packet 80. Further, each of IPv6 network packets 92 that encapsulates fragments 82 of IPv4 network packet 80 may include an indication of destination port 88 of IPv4 network packet 80 in extension header 84 or flow label 96. Thus, packet module 47 may be able to perform an anti-spoof check on each fragment of IPv4 network packet 80 by determining whether both the destination network address of IPv4 network packet 80 indicated by the fragment of IPv4 network packet 80 and the destination port 88 of IPv4 network packet 80 included in either extension header 84 or flow label 96 of the IPv6 network packet that encapsulates the fragment of IPv4 network packet 80 fall within an acceptable range of values.

Thus, packet module 47 may determine that a fragment of IPv4 network packet 80 passes the anti-spoof check if the destination network address of IPv4 network packet 80 indicated by the fragment of IPv4 network packet 80 matches the embedded IPv4 network address extracted from the IPv6 destination network address of the IPv6 network packet that encapsulates the fragment of IPv4 network packet 80 and if destination port 88 of IPv4 network packet 80 in extension header 84 or flow label 96 of the IPv6 network packet that encapsulates the fragment of IPv4 network packet 80 falls within a set of ports specified by the PSID. Conversely, packet module 47 may determine that the a fragment of IPv4 network packet 80 fails the anti-spoof check if the destination network address of IPv4 network packet 80 indicated by the fragment of IPv4 network packet 80 does not match the embedded IPv4 network address extracted from the IPv6 destination network address of IPv6 network packet that encapsulates the fragment of IPv4 network packet 80 or if destination port 88 of IPv4 network packet 80 in extension header 84 or flow label 96 of the IPv6 network packet that encapsulates the fragment of IPv4 network packet 80 does not fall within a set of ports specified by the PSID.

Because each of IPv6 network packets 92 includes either extension header 84 or flow label 96 that includes destination port 88 of IPv4 network packet 80, Packet module 47 may be able to perform an anti-spoof check on a fragment of IPv4 network packet 80 without buffering the fragment or reassembling IPv4 network packet 80, even if the fragment of IPv4 network packet 80 does not include transport header 90. If packet module 47 determines that a fragment of IPv4 network packet 80 passes the anti-spoof check, CE device 8A may forward the fragment of IPv4 network packet 80 on to IPv4 network 3 via IFCs 42 without having to buffer the fragment of IPv4 network packet 80 and without having to reassemble IPv4 network packet 80. Conversely, if packet module 47 determines that a fragment of IPv4 network packet 80 does not pass the anti-spoof check, CE device 8A may refrain from forwarding the fragment of IPv4 network packet 80 on to IPv4 network 3 and may instead drop the fragment of IPv4 network packet 80. In this way, CE device 8A may perform anti-spoof checks on fragments of IPv4 network packet 80 without assembling IPv4 network packet 80 from its fragments and without buffering fragments of IPv4 network packet 80 until network device 10 receives a fragment of IPv4 network packet 80 that includes transport header 90.

Figures 4A, 4B, 4C:
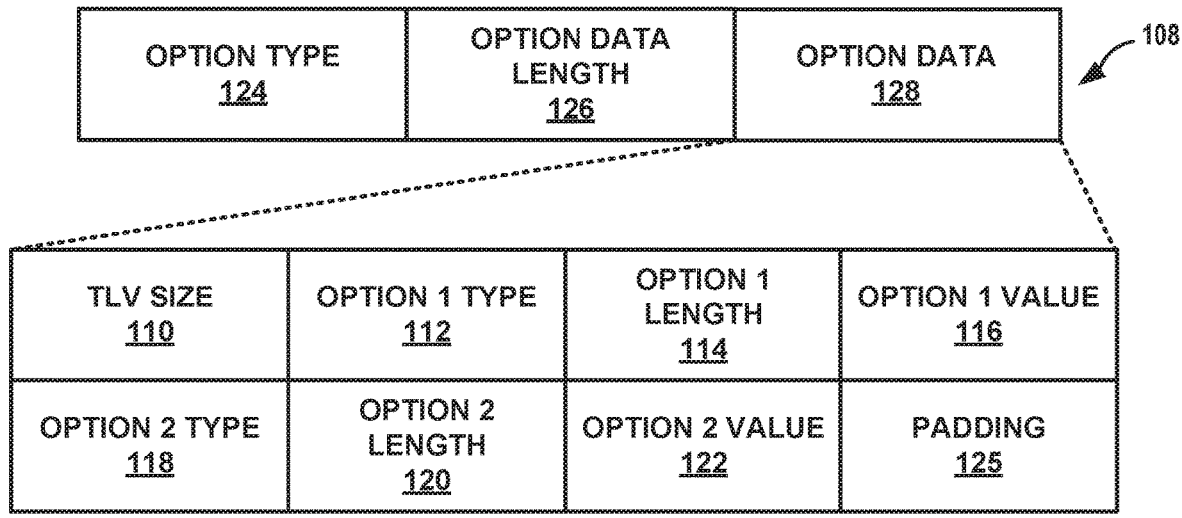
FIGS. 4A-4C are block diagrams illustrating an example IPv6 extension header that may carry a source port and a destination port, according to the techniques described herein.

FIGS. 4A-4C are block diagrams illustrating an example IPv6 extension header that may carry a source port and a destination port, according to the techniques described herein.

Examples of extension headers include hop-by-hop options headers, fragment headers, destination options headers, routing headers, authentication headers, and encapsulating security payload headers, and the like.

As shown in FIG. 4A, destination options header 102 is an example of extension header 15 of FIG. 1A and extension header 84 of FIG. 1B. A destination options header such as destination option header 102 may be used to carry optional information that is examined by a packet's destination node(s).

In accordance with aspects of this disclosure, an IPv6 network packet that encapsulates a fragment of an IPv4 network packet may include destination options header 102 that indications of the source port and the destination port of the IPv4 network packet.

Destination options header 102 includes next header field 104, header extension length field 106, and metadata option field 108. Next header field 104 may contain a value that identifies the type of header immediately following destination options header 102 in an IPv6 network packet. For example, next header field 104 may contain a value that identifies the type of header immediately following destination options header 102 in an IPv6 network packet as being a transport header, such as a TCP transport header or a UDP transport header. Header extension length field 106 may contain a value that specifies the length of destination options header 102. In some examples, the value of header extension length field 106 may specify the length of destination options header 102 in 8-octet units, not including the first 8 octets. Metadata option field 106 may include indications of the source port and the destination port of the network packet fragment encapsulated in the IPv6 network packet. For example, destination option header 102 may contain source port 16 and destination port 18 of IPv4 network packet 50 shown in FIG. 1A or source port 86 and destination port 88 of IPv4 network packet 80 shown in FIG. 1B.

FIG. 4B illustrates the metadata option field 108 of destination option header 102 in more detail. As shown in FIG. 4B, metadata option field 108 of destination option header 102 may include option type field 124, option data length field 126, and option data field 128. Option type field 124 may contain a value, such as having three high order bits of "000" that indicate metadata option field 108 includes the source port and the destination port. The value of option type field 124 may also indicate to intermediate nodes to skip destination options header 102 and that destination options header 102 cannot be changed on its way to the destination.

Option data field 128 may contain fields in the form of type-length-value. That is, option data field 128 may contain one or more sets of type, length, and value fields. In the example of FIG. 4B, option data field 128 may include two sets of type-length-value fields: a first set for storing a source port and a second set for storing a destination port. As such, option data field 128 may include TLV size field 110 having a value that indicates the number (e.g., two) of TLVs in option data field 128, first option type field 112, first option length field 114, first option value field 116, second option type field 118, second option length field 120, second option value field 122, and padding 125.

FIG. 4C illustrates a detailed example of destination option header 102 that includes indications of both a source port and a destination port. As shown in FIG. 4C, destination option header 102 may include next header field 104, header length field 106, padding 130, padding 132, option type field 126, option length field 128, TLV size field 110, first option type field 112, first option length field 114, padding 134, first option value field 116, second option type field 118, second option length field 120, and second option value field 122.

Destination option header 102 may include two sets of TLV fields for including a source port and a destination port. Thus, the value of TLV size field 110 may be set to 2. A first TLV in destination option header 102 that specifies the source port may include first option type field 112, first option length field 114, and first option value field 116. First option type field 112 may contain a value, such as 1, that indicates first option length field 114 as containing the source port. First option value field 116 may have a value of 2, indicating that the size of first option value field 116 is 2 bytes. First option value field 116 may contain the source port, such as 1232.

As discussed above, a second TLV in destination option header 102 that specifies the destination port may include second option type field 118, second option length field 120, and second option value field 122. Second option type field 118 may contain a value, such as 2, that indicates second option value field 122 as containing the destination port. Second option value field 120 may have a value of 2, indicating that the size of second option value field is 2 bytes. Second option value field 122 may contain the destination port, such as 80.

Figure 5A:
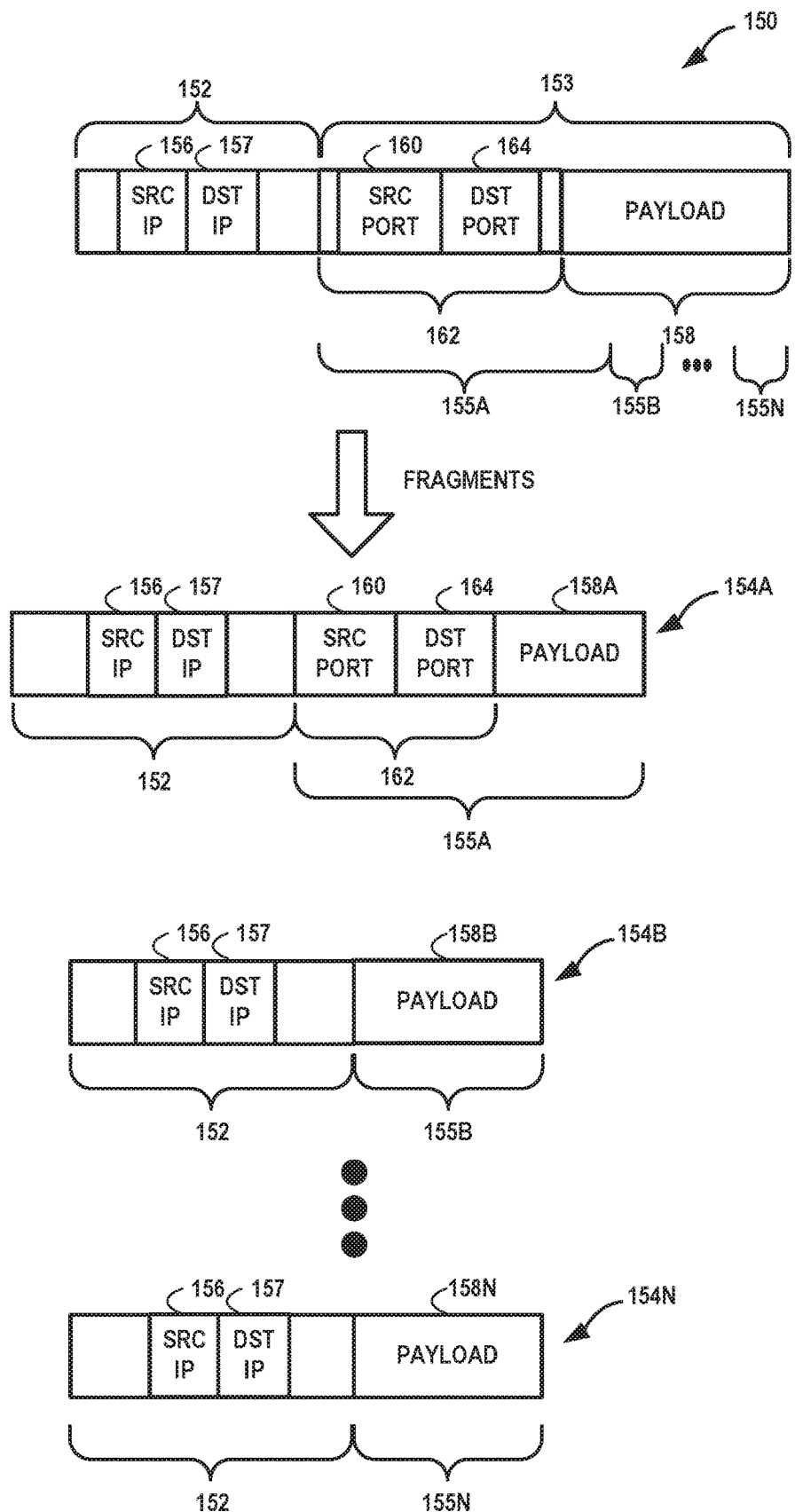
FIGS. 5A-5C are block diagrams illustrating an example IPv4 network packet that is fragmented into example fragments and example IPv6 network packets that encapsulate the example fragments of the example IPv4 network packet, according to the techniques described herein.
Figure 5B:
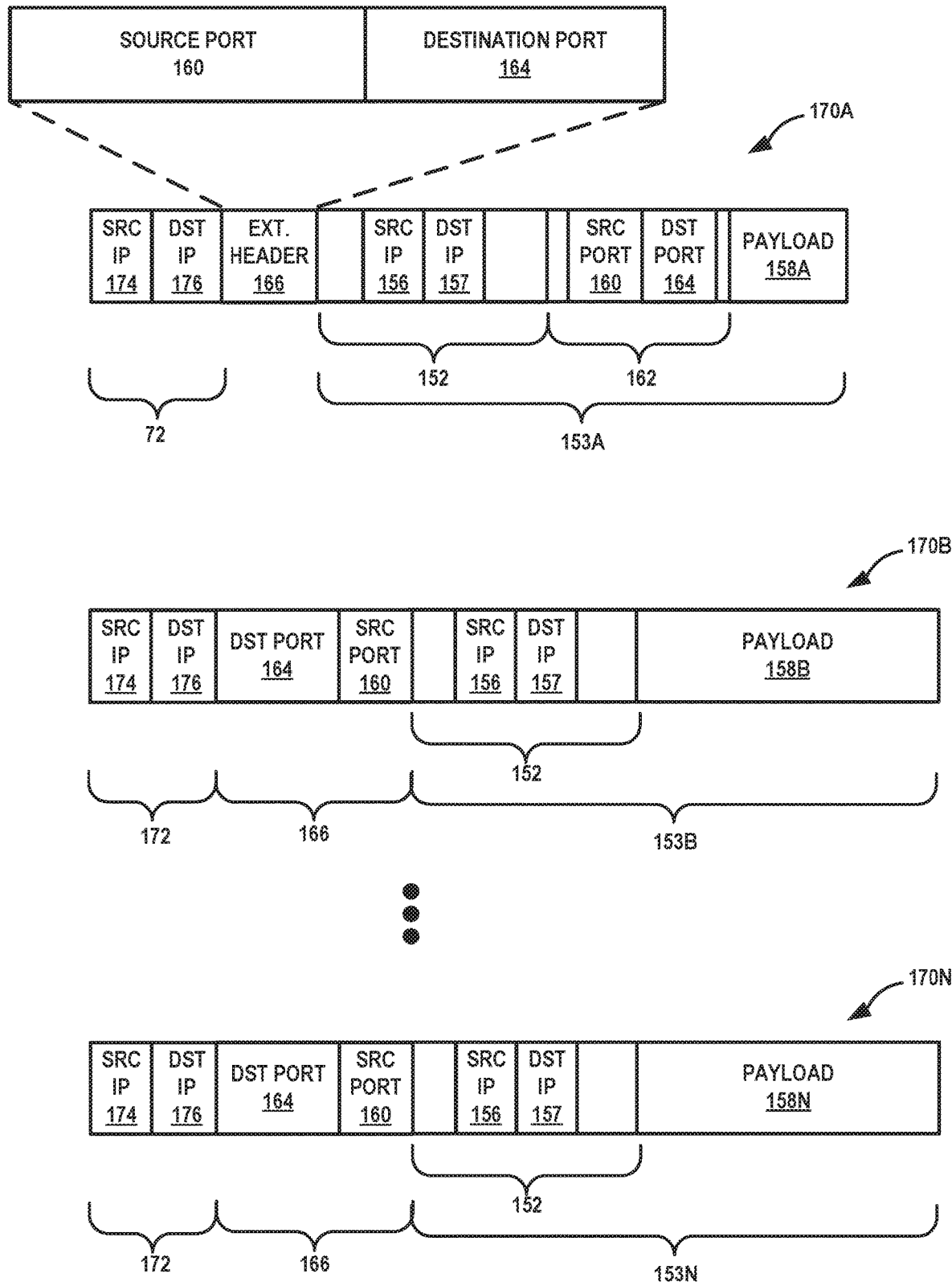
Figure 5C:
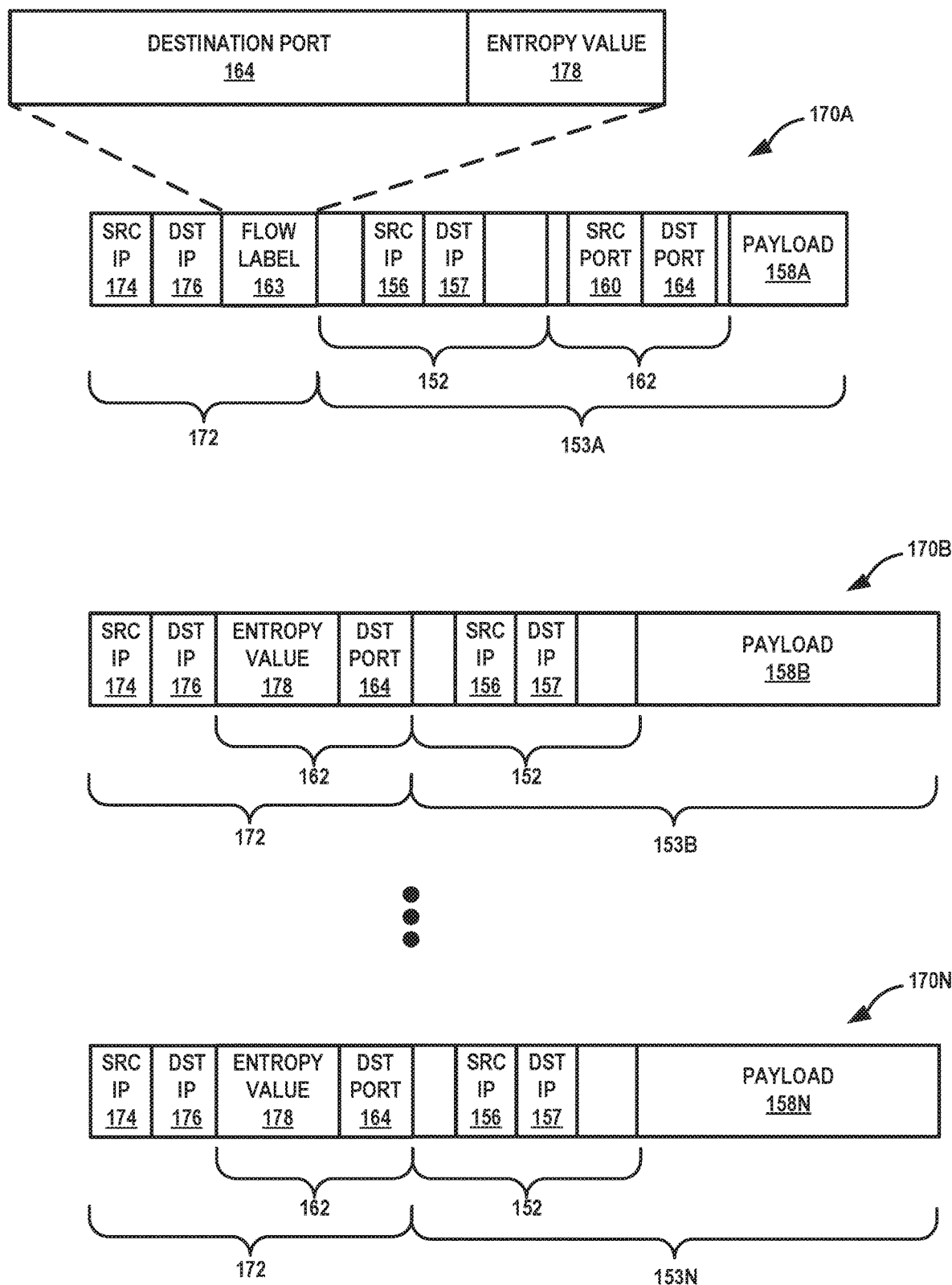

FIGS. 5A-5C are block diagrams illustrating an example IPv4 network packet that is fragmented into example fragments and example IPv6 network packets that encapsulate the example fragments of the example IPv4 network packet, according to the techniques described herein. A network device, such as network device 10 or CE device 8A, may receive an IPv4 network packet, such as IPv4 network packet 150 from an IPv4 network, such as from IPv4 host device 5, and may fragment a received IPv4 network packet using the techniques described with respect to FIGS. 5A-5C.

The network device may determine whether to encapsulate IPv4 network packet 150 within an IPv4 network packet in order to transmit IPv4 network packet 150 via an IPv6 network, such as IPv6 network 6 based at least in part on determining whether an IPv6 network packet that encapsulates IPv4 network packet 150 is larger than a maximum transmission unit (MTU) for IPv6 network 6. If the network device determines that the IPv6 network packet that encapsulates IPv4 network packet 150 is larger than the MTU for IPv6 network 6, the network device may fragment IPv4 network packet 150 into fragments 154A-154N, encapsulate the fragments 154A-154N in IPv6 network packets 170A-170N, and transmit the IPv6 network packets 170A-170N via IPv6 network 6 to, for example, network device 10. Fragments 154A-154N may be examples of fragments 62A-62N of FIG. 1A and fragments 82A-82N of FIGS. 1B and 1C. IPv6 network packets 170A-170N may be examples of IPv6 network packets 70A-70N of FIG. 1A and IPv6 network packets 92A-92N of FIGS. 1B and 1C.

A network device, such as network device 10 or CE device 8A, may receive IPv6 network packets 170A-170N that encapsulate fragments 154A-154N of IPv4 network packet 150. The network device may decapsulate the fragments 154 of IPv4 network packet 150 from the IPv6 network packets 170A-170N and may perform anti-spoof checks on the decapsulated fragments 154A-154N of IPv4 network packet 150.

As shown in FIG. 5A, IPv4 network packet 150 may include header 152 followed by data section 153. Header 152 may include fields that specifies various information regarding IPv4 network packet 150. In the example of FIG. 5A, header 152 may include fields that specify source address 156 of IPv4 network packet 150 and destination address 157 of IPv4 network packet 150. Source address 156 of IPv4 network packet 150 may be the IPv4 address of the sender of IPv4 network packet 150. Destination address 157 of IPv4 network packet 150 may be the IPv4 address of the receiver of IPv4 network packet 150. Header 152 may include additional fields not shown in FIG. 5A, such as a protocol field that specifies the protocol used in data section 153 of IPv4 network packet 150, such as Transmission Control Protocol (TCP) or User Datagram Protocol (UDP). For example, header 152 may include a total of fourteen fields, thirteen of which are required.

Data section 153 of IPv4 network packet 150 may include data associated with the transport layer protocol, such as TCP, UDP, and the like, utilized to transport IPv4 network packet 150 across networks such as IPv6 network 6. Data section 153 of IPv4 network packet 150 may include transport header 162 followed by payload 158. Transport header 162 may be a TCP header, UDP header, and the like depending on the transport layer protocol used to transport IPv4 network packet 150. Transport header 162 may include a field that specifies source port 160 of IPv4 network packet 150 and a field that specifies destination port 164 of IPv4 network packet 150. Source port 160 may be the sending port of the sender of IPv4 network packet 150, and destination port 164 may be the destination port of the receiver of IPv4 network packet 150. Transport header 162 may include additional fields that specify additional information not shown in FIG. 5A. Payload 158 of IPv4 network packet 150 may be data carried by IPv4 network packet 150 besides header 152 and transport header 162.

A network device, such as network device 10 and CE device 8A, may fragment IPv4 network packet 150 by dividing data section 153 of IPv4 network packet 150 into sequential data section fragments 155A-155N ("data section fragments 155"), which are sequential non-overlapping portions of data section 153 of IPv4 network packet 150. Data section fragment 155A may include a sequentially first portion of data section 153, including transport header 162 and a first portion of payload 158. Data section fragment 155N may include the sequentially last non-overlapping portion of payload 158. One or more data section fragments, such as data section fragment 155B, may each contain a non-overlapping portion of payload 158 between the portions of payload 158 contained in data section fragment 155A and data section fragment 155N. As can be seen, only data section fragment 155A contains transport header 162, while none of the remaining data section fragments 155B-155N contains transport header 162.

The network device may generate fragments 154A-154N ("fragments 154") of IPv4 network packet 150 that each contains IPv4 header 152 and one of data section fragments 155. The network device may encapsulate fragments 154 into IPv6 network packets, so that each fragment of fragments 154 is encapsulated within a separate IPv6 network packet. Thus, if fragments 154 includes a total of five fragments, network device 10 may encapsulate the five fragments within five IPv6 network packets that each contain one of the five fragments.

In accordance with aspects of the present disclosure, A network device, such as network device 10 and CE device 8A, may encapsulate fragments 154 within IPv6 network packets to result in IPv6 network packets 170 that each include an indication of source port 160 of IPv4 network packet 150. As shown in FIG. 5B, a network device may perform MAP-E to encapsulate fragments 154 within IPv6 network packets. In particular, CE device 8A may encapsulate fragment 154A within IPv6 network packet 170A, encapsulate fragment 154B within IPv6 network packet 170B, encapsulate fragment 154N within IPv6 network packet 170N, and so on. An IPv6 network packet includes IPv6 header 172 and a payload (e.g., one of fragments 154). Thus, IPv6 network packet 170A includes IPv6 header 172 and fragment 154A, IPv6 network packet 170B includes IPv6 header 172 and fragment 154B, and IPv6 network packet 170C includes IPv6 header 172 and fragment 154C.

IPv6 header 172 may include fields that specify IPv6 source address 174 and IPv6 destination address 176. IPv6 source address 174 specifies the IPv6 address of the sender of the IPv6 network packet. IPv6 destination address 176 specifies the IPv6 address of the receiver of the IPv6 network packet. It should be understood that IPv6 header 172 may include additional fields that specify additional information that are not shown in FIG. 5B.

To perform MAP-E to encapsulate fragments 154 within IPv6 network packets 170, the network device may generate IPv6 network header 172 that specifies IPv6 source address 174 and IPv6 destination address 176, based at least in part on fragments 154. The network device may use an address plus port technique for packet routing, where the source address 156 specified by IPv4 network packet 150 is extended by at least a portion of the source port 160 specified by IPv4 network packet 150, and the destination addresses 157 specified by IPv4 network packet 150 is extended by at least a portion of the destination port 164 specified by IPv4 network packet 150. Thus, the network device may generate IPv6 source address 174 based at least in part on source address 156 specified by IPv4 network packet 150 and source port 160 specified by IPv4 network packet 150. Similarly, the network device may generate IPv6 destination address 176 based at least in part on destination addresses 157 specified by IPv4 network packet 150 and destination port 164 specified by IPv4 network packet 150.

In the example of FIG. 5B, IPv6 header 172 of each of IPv6 network packets 170 may also include extension header 166 that identifies the flow of network packets to which IPv6 network packets 170 belong. Extension header 166 may be an example of extension header 15 of FIG. 1A and destination options header 102 of FIGS. 4A-4C.

CE device 8A may create extension header 166 for each of IPv6 network packets 170 that indicates source port 160 of IPv4 network packet 150 and destination port 164 of IPv4 network packet 150, so that each of IPv6 network packets 170 includes an indication of source port 160 of IPv4 network packet 150 and destination port 164 of IPv4 network packet 150.

Each of IPv6 network packets 170 may therefore include extension header 166 that indicates source port 160 of IPv4 network packet 150 and destination port 164 of IPv4 network packet 150. Each of IPv6 network packets 170 may also include IPv4 header 152 that specifies source address 156 of IPv4 network packet 150 and destination address 157 of IPv4 network packet. Each of IPv6 network packets 170 may further include source address 174 of the IPv6 network packet and destination address 176 of the IPv6 network packet. As such, each of IPv6 network packets 170 may include or otherwise specify all of the information for performing an anti-spoof check on the encapsulated fragment of IPv4 network packet 140.

For example, a network device may perform an anti-spoof check on fragment 154B of IPv4 network packet 150 based at least in part on source port 160 of IPv4 network packet 150 that is indicated by extension header 166 of IPv6 network packet 170B. In other examples, a network device may perform an anti-spoof check on fragment 154B of IPv4 network packet 150 based at least in part on destination port 164 of IPv4 network packet 150.

Note that even though fragment 154B of IPv4 network packet 150 encapsulated by IPv6 network packet 170B does not include transport header 162, a network device is still able to perform an anti-spoof check on fragment 154B of IPv4 network packet 150 encapsulated in IPv6 network packet 170B because IPv6 network packet 170B includes extension header 166 that indicates source port 160 of IPv4 network packet 150 and destination port 164 of IPv4 network packet 150. Thus, even if the network device has yet to receive IPv6 network packet 170A that includes transport header 162 of IPv4 network packet 150 prior to receiving IPv6 network packet 170B that does not include transport header 162 of IPv4 network packet 150, the network device may still be able to perform an anti-spoof check on fragment 154B of IPv4 network packet 150 encapsulated by IPv6 network packet 170B based on the information contained within IPv6 network packet 170B.

Network device 10 may determine whether fragment 154B of IPv4 network packet 150 passes the anti-spoof check and may, based on fragment 154B of IPv4 network packet 150 passing the anti-spoof check, forward fragment 154B of IPv4 network packet 150 on to IPv4 network 4. Conversely, if network device 10 determines that fragment 154B of IPv4 network packet 150 failed the anti-spoof check, network device 10 may refrain from forwarding fragment 154B of IPv4 network packet 150 on to IPv4 network 4 and may instead drop fragment 154B of IPv4 network packet 150.

Network device 10 may continue to receive one or more additional IPv6 network packets 170 that encapsulates one or more fragments 154 of IPv4 network packet 150 until it has received every one of IPv6 network packets 170. Network device 10 may, in response to receiving each respective IPv6 network packet of the one or more additional IPv6 network packets 170, decapsulate a respective fragment of IPv4 network packet 150 from each respective IPv6 network packet of the one or more additional IPv6 network packets 170, and perform an anti-spoof check on the respective fragment of IPv4 network packet 150.

Network device 10 may determine whether each respective fragment of IPv4 network packet 150 passes the anti-spoof check and may, based on the respective fragment of IPv4 network packet 150 passing the anti-spoof check, forward the respective fragment of IPv4 network packet 150 on to an IPv4 network, such as IPv4 network 3 or IPv4 network 4 of FIGS 1A-1C. Conversely, if network device 10 determines that a fragment of network packet 150 failed the anti-spoof check, network device 10 may refrain from forwarding the fragment of IPv4 network packet 150 on to an IPv4 network and may instead drop the respective fragment of IPv4 network packet 150.

In some examples, instead of using extension header 166 to carry indicates source port 160 of IPv4 network packet 150 and destination port 164 of IPv4 network packet 150 in each of IPv6 network packets 170, aspects of this disclosure describe techniques for carrying destination port 164 of IPv4 network packet 150 in each of IPv6 network packets 170 using a flow label.

As shown in FIG. 5C, IPv6 header 172 of each of IPv6 network packets 170 may also include flow label 163 that identifies the flow of network packets to which IPv6 network packets 170 belong. Because IPv6 network packets 170 carry fragments 154 of the same IPv4 network packet 150, a network device such as network device 10 and CE device 8A may identify IPv6 network packets 170 as belonging to the same flow of network packets by creating flow label 163 that is the same for each of IPv6 network packets 170 and by including flow label 163 in IPv6 header 172 of each of IPv6 network packets 170.

A network device may create flow label 163 for each of IPv6 network packets 170 that indicates destination port 164 of IPv4 network packet 150, so that each of IPv6 network packets 170 includes an indication of destination port 164 of IPv4 network packet 150. In some examples, the network device may create flow label 163 that indicates destination port 164 of IPv4 network packet 150 by creating flow label 163 that includes destination port 164 of IPv4 network packet 150. Further, to prevent two unrelated flows of network packets from having the same flow label, such as two unrelated flows of IPv6 network packets that encapsulate fragments of IPv4 network packets having the same source port, a network device may include entropy value 178 in flow label 163 along with an indication of destination port 164, where entropy value 178 may be a bitwise representation of a random number that is determined by the network device that creates flow label 163.

In some examples, flow label 163 may be a 20-bit field, and destination port 164 may be a 16-bit value. As such, a network device may create flow label 163 that includes the 16-bit value of destination port 164 as well as 4 bits of entropy value 178. In some examples, a network device may create flow label 163 that includes destination port 164 as the sixteen most significant bits of flow label 163 and entropy value 178 as the four least significant bits of flow label 163, while in other examples a network device may create flow label 163 that includes destination port 164 as the sixteen least significant bits of flow label 163 and entropy value 178 as the four most significant bits of flow label 163. CE device 8A may also arrange destination port 164 and entropy value 178 in any other fashion in the 20-bit flow label 163, such as by interleaving the bits of destination port 164 with entropy value 178 in any appropriate fashion. For example, a network device may create flow label 163 where the most significant two bits of entropy value 178 are the two most significant bits of flow label 163, followed by sixteen bits of destination port 164, followed by the two least significant bits of entropy value 178 as the two least significant bits of flow label 163.

In some examples, a network device that creates flow label 163 may encrypt or otherwise obfuscate the value of destination port 164 included in flow label 163. For example, the network device may encrypt destination port 164 via any suitable encryption techniques to result in an encrypted destination port that the network device may include in flow label 163. In some examples, to encrypt or to obfuscate the value of destination port 164, the network device may perform one's complement or two's complement on the value of destination port 164 and may include the resulting value of destination port 164 in flow label 163 along with entropy value 178.

In this way, a network device may create flow label 163 that indicates destination port 164 of IPv4 network packet 150 and is the same for each of IPv6 network packets 170 to identify IPv6 network packets 170 as being part of the same flow of network packets. Because each of IPv6 network packets 170 includes flow label 163 that indicates destination port 164 of IPv4 network packet 150, a network device, each respective IPv6 network packet of IPv6 network packets 170 may include or otherwise specify all of the information for performing an anti-spoof check on the respective IPv6 network packet.

A network device that receives an IPv6 network packet that encapsulates a fragment of an IPv4 network packet may be able to perform an anti-spoof check on the encapsulated fragment even if the encapsulated fragment does not include a transport header for the IPv4 network packet. For example, a network device may receive in IPv6 network packet 170B and may, in response, decapsulate fragment 154B of IPv4 network packet 150 from IPv6 network packet 170B and perform an anti-spoof check on fragment 154B of IPv4 network packet 150 based at least in part on destination port 164 of IPv4 network packet 150 that is indicated by flow label 163 of IPv6 network packet 170.

Note that even though fragment 154B of IPv4 network packet 150 encapsulated by IPv6 network packet 170B does not include destination port 164 for IPv4 network packet 150 because fragment 154B of IPv4 network packet 150 does not include transport header 162, a network device is still able to perform an anti-spoof check on fragment 154B of IPv4 network packet 150 encapsulated in IPv6 network packet 170B because IPv6 network packet 170B includes flow label 163 that indicates destination port 164 of IPv4 network packet 150. Thus, even if a network device has yet to receive IPv6 network packet 170A that includes transport header 162 of IPv4 network packet 150 prior to receiving IPv6 network packet 170B that does not include transport header 162 of IPv4 network packet 150, the network device may still be able to perform an anti-spoof check on fragment 154B of IPv4 network packet 150 encapsulated by IPv6 network packet 170B based on the information contained within IPv6 network packet 170B.

The network device may determine whether fragment 154B of IPv4 network packet 150 passes the anti-spoof check and may, based on fragment 154B of IPv4 network packet 150 passing the anti-spoof check, forward fragment 154B of IPv4 network packet 150 on to an IPv4 network, such as IPv4 network 3 or IPv4 network 4 of FIGS. 1A-1C. Conversely, if the network device determines that fragment 154B of IPv4 network packet 150 failed the anti-spoof check, the network device may refrain from forwarding fragment 154B of IPv4 network packet 150 on to an IPv4 network and may instead drop fragment 154B of IPv4 network packet 150.

The network device may continue to receive one or more additional IPv6 network packets 170 that encapsulates one or more fragments 154 of IPv4 network packet 150 until it has received every one of IPv6 network packets 170. The network device may, in response to receiving each respective IPv6 network packet of the one or more additional IPv6 network packets 170, decapsulate a respective fragment of IPv4 network packet 150 from each respective IPv6 network packet of the one or more additional IPv6 network packets 170, and perform an anti-spoof check on the respective fragment of IPv4 network packet 150 based at least in part on destination port 164 for IPv4 network packet 150 that is indicated by a respective flow label 163 of the respective IPv6 network packet.

The network device may determine whether each respective fragment of IPv4 network packet 150 passes the anti-spoof check and may, based on the respective fragment of IPv4 network packet 150 passing the anti-spoof check, forward the respective fragment of IPv4 network packet 150 on to an IPv4 network. Conversely, if the network device determines that the respective fragment of network packet 150 failed the anti-spoof check, network device 10 may refrain from forwarding the respective fragment of IPv4 network packet 150 on to an IPv4 network and may instead drop the respective fragment of IPv4 network packet 150.

FIG. 6 is a flowchart illustrating an example process for performing an anti-spoof check on fragments of an IPv4 network packet without buffering fragments of the IPv4 network packet and without reassembling the IPv4 network packet, according to techniques described herein. The techniques illustrated in FIG. 6 are described with respect to FIGS. 1A-1B, FIG. 2, FIG. 3, FIGS. 4A-4B, and FIGS. 5A-B.

As shown in FIG. 6, a network device such as network device 10 or CE device 8A may receive, from a first network (e.g., IPv6 network 6), a network packet of a first network packet type (e.g., IPv6 network packet 70B or IPv6 network packet 92B) that encapsulates a fragment of a second network packet of a second network packet type (e.g., fragment 62B of IPv4 network packet 50 or fragment 82B of IPv4 network packet 80), wherein the network packet is part of a flow of a plurality of network packets of the first network packet type that encapsulates fragments of the second network packet, and wherein the network packet includes an extension header (e.g., extension header 15 or extension header 84) that indicates a source port (e.g., source port 16 or source port 86) for the network packet and a destination port (e.g., destination port 18 or destination port 88) for the network packet (602). The network device may, in response to receiving the network packet, perform an anti-spoof check on the fragment of the second network packet based at least in part on at least one of: the source port for the second network packet that is indicated by the extension header or the destination port for the second network packet (604).

The network device may, based on the fragment of the second network packet passing the anti-spoof check, forward the fragment of the second network packet to a second network (606). In some examples, the first network is an Internet Protocol version 6 (IPv6) network, such as IPv6 network 6 (see FIGS. 1A-1C), the second network is an Internet Protocol version 4 (IPv4) network, such as IPv4 network 4 or IPv4 network 3, the network packet of the first network packet type is an IPv6 network packet, such as one of IPv6 network packets 70 or one of IPv6 network packets 92, and the second network packet of the second network packet type is an IPv4 network packet, such as IPv4 network packet 50 or IPv4 network packet 50.

In some examples, the network device has not received any fragments of the second network packet that includes an indication of the source port for the second network packet and an indication of the destination port for the second network packet, and the fragment of the second network packet encapsulated by the network packet does not include the indication of the source port for the second network packet and does not include the indication of the destination port for the second network packet.

In some examples, network device 10 may receive one or more additional network packets of the flow of the plurality of network packets that encapsulate one or more fragments of the second network packet. Network device 10 may, in response to receiving each respective network packet of the one or more additional network packets, perform the anti-spoof check on a respective fragment of the second network packet encapsulated by the respective network packet based at least in part on at least one of: the source port for the second network packet that is indicated by a corresponding extension header of the respective network packet or the destination port for the second network packet that is indicated by the corresponding extension header of the respective network packet. The network device may, based on the respective fragment of the second network packet passing the anti-spoof check, forwarding, by the network device, the respective fragment of the second network packet to the second network.

In some examples, the extension header comprises a destination options header, such as destination options header 102 that includes a metadata options field that stores the source port for the second network packet and the destination port for the second network packet.

Figure 7:
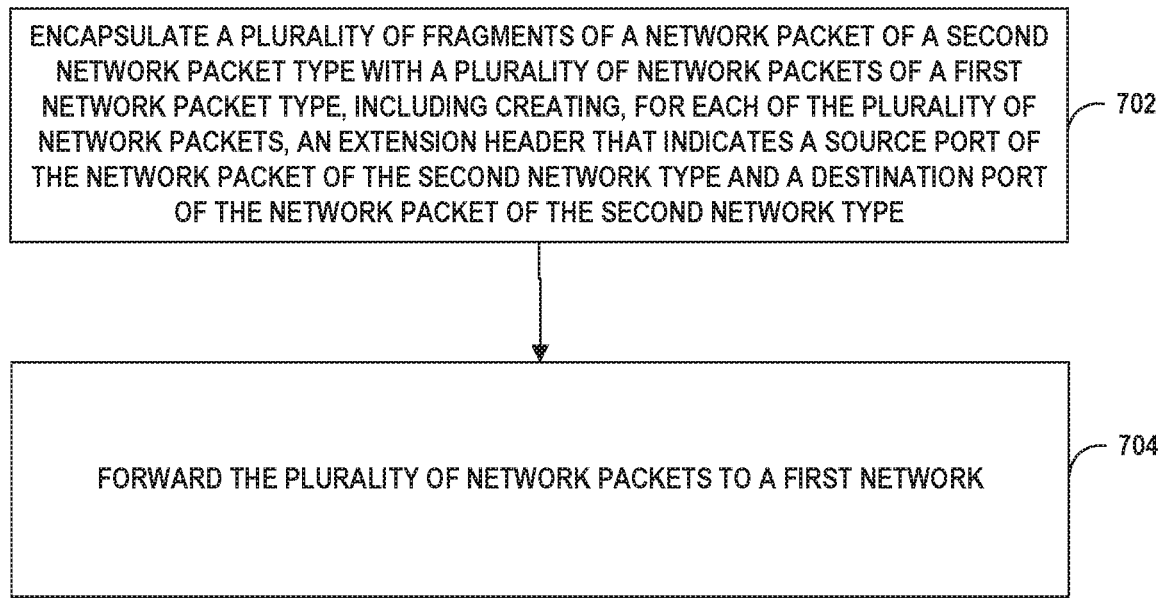
FIG. 7 is a flowchart illustrating an example process for encapsulating fragments of an IPv4 network packet within IPv6 network packets that each include an extension header that indicates the source port for the IPv4 network packet, according to techniques described herein.

FIG. 7 is a flowchart illustrating an example process for encapsulating fragments of an IPv4 network packet within IPv6 network packets that each include an extension header that indicates the destination port and the source port for the IPv4 network packet, according to techniques described herein. The techniques illustrated in FIG. 7 are described with respect to FIGS. 1A-1B, FIG. 2, FIG. 3, FIGS. 4A-4B, and FIGS. 5A-B.

As shown in FIG. 7, a network device such as network device 10 or CE device 8A may encapsulate a plurality of fragments of a network packet of a second network type (e.g., fragments 62 of IPv4 network packet 50 or fragments 82 of IPv4 network packet 80) with a plurality of network packets of a first network packet type (e.g., IPv6 network packets 70 or IPv4 network packets 92), including creating, for each of the plurality of network packets, an extension header (e.g., extension header 15 or extension header 84) that indicates a source port (e.g., source port 16 or source port 86) of the network packet of the second network type and a destination port (e.g., destination port 18 or destination port 88) of the network packet of the second network type (702). The network device may forward the plurality of network packets to a first network (704). In some examples, the extension header comprises a destination options header, such as destination options header 102 that includes a metadata options field that stores the source port for the second network packet and the destination port for the second network packet.

In some example, the network device may receive, from a second network (e.g., IPv4 network 3 or IPv4 network 4), a network packet of a second network packet type (e.g., IPv4 network packet 50 or IPv4 network packer 80). The network device may fragment the network packet into a plurality of fragments of the network packet of the second network type (e.g., fragments 62 of IPv4 network packet 50 or fragments 82 of IPv4 network packet 80). In some examples, the network device may receive, from a second network (e.g., IPv4 network 3 or IPv4 network 4), the plurality of fragments of the network packet of the second network packet type (e.g., fragments 62 of IPv4 network packet 50 or fragments 82 of IPv4 network packet 80).

In some examples, the first network is an Internet Protocol version 6 (IPv6) network such as IPv6 network 6, the second network is an Internet Protocol version 4 (IPv4) network such as IPv4 network 4 or IPv4 network 3, the plurality of network packets of the first network packet type is a plurality of IPv6 network packets such as IPv6 network packets 70 or IPv6 network packets 92, and the network packet of the second network packet type is an IPv4 network packet such as IPv4 network packet 50 or IPv4 network packet 80.

Figure 8:
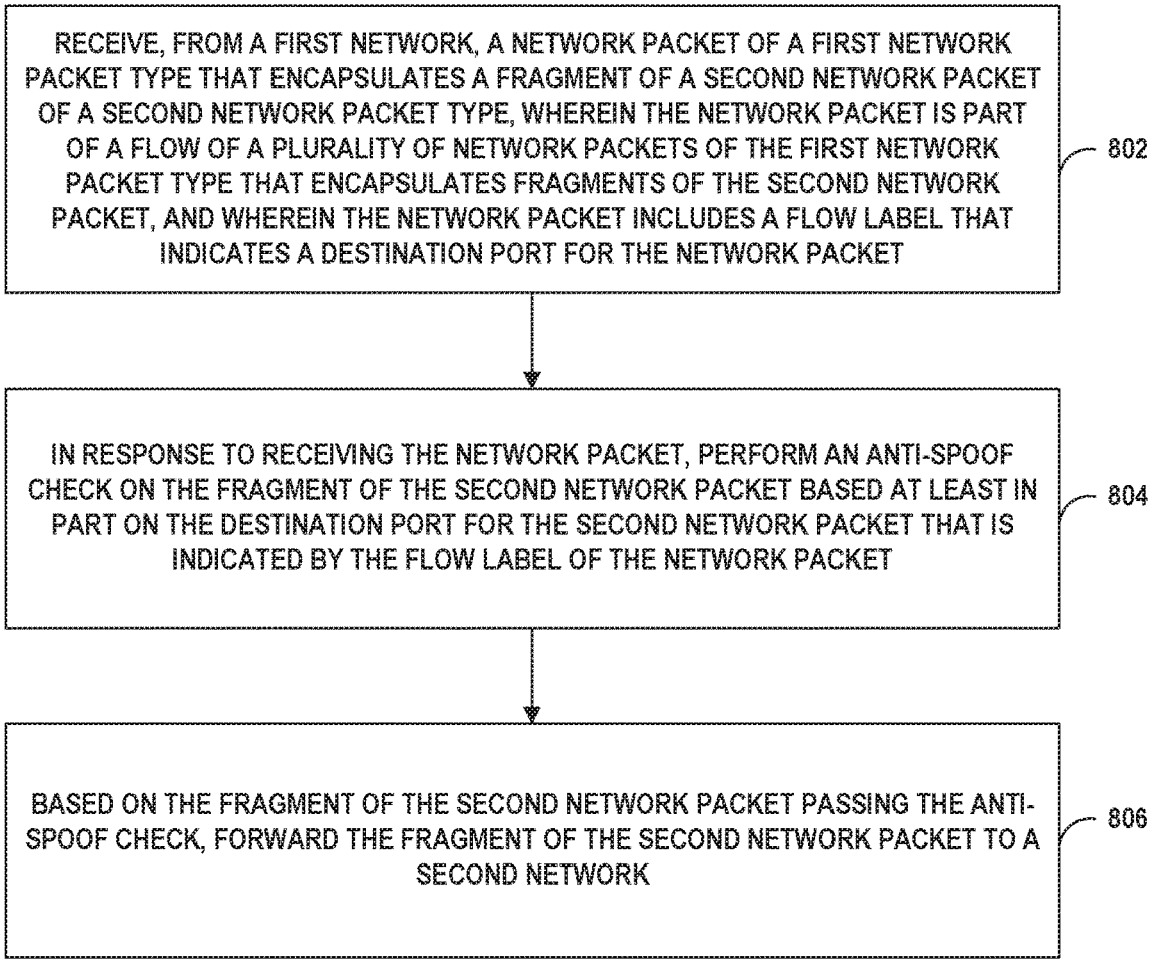
FIG. 8 is a flowchart illustrating an example process for performing an anti-spoof check on fragments of an IPv4 network packet without buffering fragments of the IPv4 network packet and without reassembling the IPv4 network packet, according to techniques described herein.

FIG. 8 is a flowchart illustrating an example process for performing an anti-spoof check on fragments of an IPv4 network packet without buffering fragments of the IPv4 network packet and without reassembling the IPv4 network packet, according to techniques described herein. The techniques illustrated in FIG. 8 are described with respect to FIG. 1C, FIG. 2, FIG. 3, and FIGS. 5A-5C.

As shown in FIG. 8, CE device 8A may receive, from a first network (e.g., IPv6 network 6), a network packet of a first network packet type (e.g., IPv6 network packet 92B) that encapsulates a fragment of a second network packet of a second network packet type (e.g., fragment 82B of IPv4 network packet 80), wherein the network packet is part of a flow of a plurality of network packets of the first network packet type that encapsulates fragments of the second network packet, and wherein the network packet includes a flow label (e.g., flow label 96) that indicates a destination port (e.g., destination port 88) for the network packet (802). CE device 8A may, in response to receiving the network packet, perform an anti-spoof check on the fragment of the second network packet based at least in part on the source port, for the second network packet that is indicated by the flow label of the network packet (804).

CE device 8A may, based on the fragment of the second network packet passing the anti-spoof check, forward the fragment of the second network packet to a second network (806). In some examples, the first network is an Internet Protocol version 6 (IPv6) network 6, the second network is an Internet Protocol version 4 (IPv4) network 3, the network packet of the first network packet type is an IPv6 network packet, such as one of IPv6 network packets 92, and the second network packet of the second network packet type is an IPv4 network packet, such as IPv4 network packet 80.

In some examples, CE device 8A has not received any fragments of the second network packet that includes an indication of the source port for the second network packet, and the fragment of the second network packet encapsulated by the network packet does not include the indication of the source port for the second network packet.

In some examples, CE device 8A may receive one or more additional network packets of the flow of the plurality of network packets that encapsulate one or more fragments of the second network packet. CE device 8A may, in response to receiving each respective network packet of the one or more additional network packets, perform the anti-spoof check on a respective fragment of the second network packet encapsulated by the respective network packet based at least in part on the destination port for the second network packet that is indicated by a respective flow label of the respective network packet. CE device 8A may, based on the respective fragment of the second network packet passing the anti-spoof check, forwarding, by the network device, the respective fragment of the second network packet to the second network.

In some examples, the flow label comprises an indication of the destination port for the second network packet and an entropy value. In some examples, the flow label comprises an encrypted destination port, and CE device 8A may perform the anti-spoof check on the fragment of the second network packet based at least in part on the destination port for the second network packet that is indicated by the flow label of the network packet by decrypting the encrypted destination port to determine the source port for the second network packet.

Figure 9:
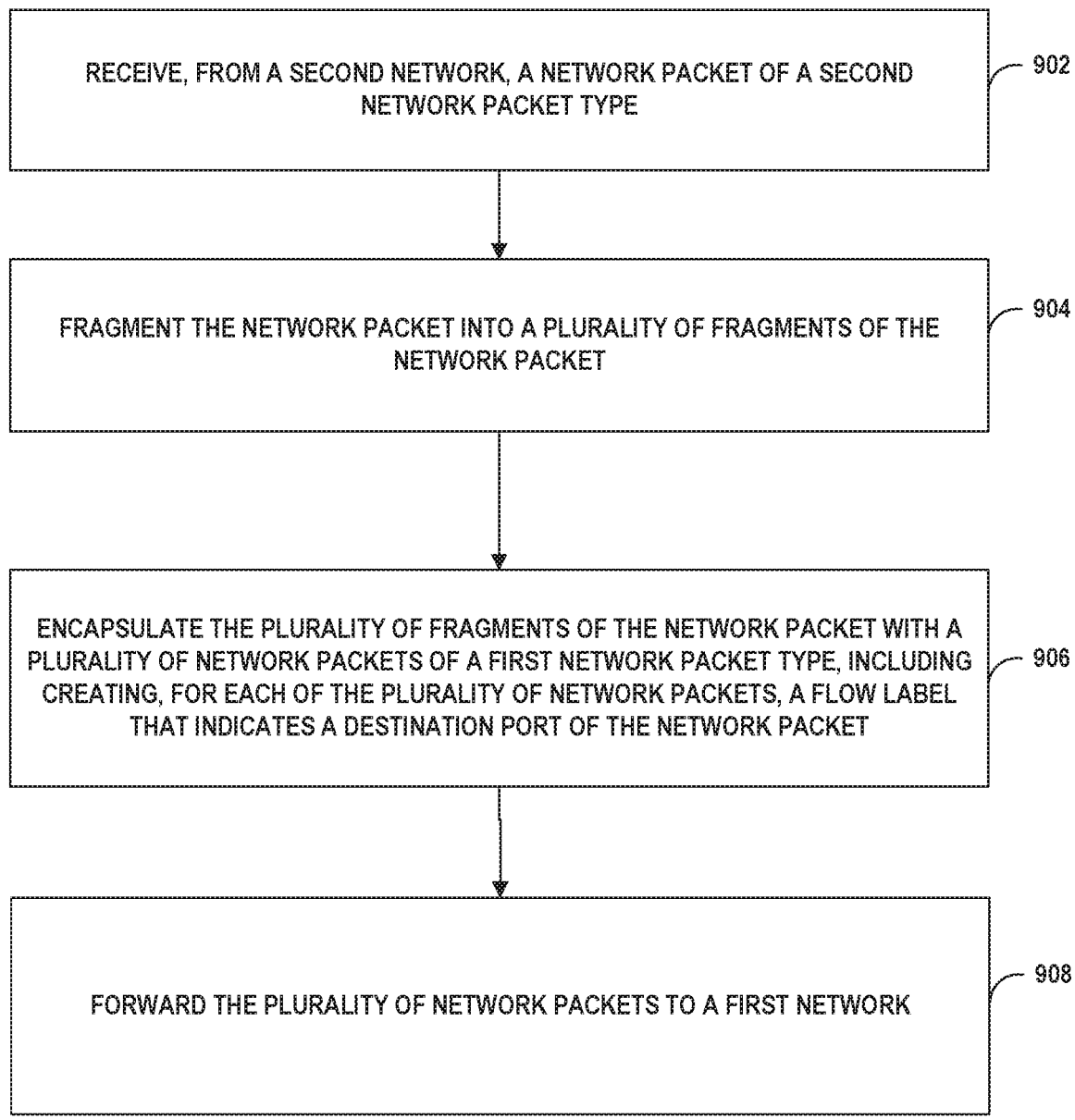
FIG. 9 is a flowchart illustrating an example process for encapsulating fragments of an IPv4 network packet within IPv6 network packets that each include a flow label that indicates the source port for the IPv4 network packet, according to techniques described herein.

FIG. 9 is a flowchart illustrating an example process for encapsulating fragments of an IPv4 network packet within IPv6 network packets that each include a flow label that indicates the source port for the IPv4 network packet, according to techniques described herein. The techniques illustrated in FIG. 9 are described with respect to FIG. 1C, FIG. 2, FIG. 3, and FIGS. 5A-5C.

As shown in FIG. 9, a network device such as network device 10 may receive, from a second network (e.g., IPv4 network 4), a network packet of a second network packet type (e.g., IPv4 network packet 80) (902). Network device 10 may fragment the network packet into a plurality of fragments of the network packet (e.g., fragments 82) (904). Network device 10 may encapsulate the plurality of fragments of the network packet with a plurality of network packets of a first network packet type (e.g., IPv6 network packets 92), including creating, for each of the plurality of network packets, a flow label (e.g., flow label 96) that indicates a destination port (e.g., destination port 88) of the network packet (906). In some examples, to create, for each of the plurality of network packets, the flow label that indicates the source port of the network packet network device 10 may create the flow label that includes an entropy value (e.g., entropy value 98) and an indication of the destination port of the network packet.

In some examples, to create, for each of the plurality of network packets, the flow label that indicates the destination port of the network packet, network device 10 may encrypt the destination port of the network packet to generate an encrypted destination port of the network packet and may create, for each of the plurality of network packets, the flow label that includes the encrypted destination port. In some examples, to create, for each of the plurality of network packets, the flow label that indicates the destination port of the network packet, network device 10 may create, for each of the plurality of network packets, the flow label that includes an entropy value.

Network device 10 may forward the plurality of network packets to a first network (908). Each of the plurality of network packets includes the same flow label that identifies the plurality of network packets as belonging to the same flow of network packets. In some examples, the first network is an Internet Protocol version 6 (IPv6) network such as IPv6 network 6, the second network is an Internet Protocol version 4 (IPv4) network such as IPv4 network 4, the plurality of network packets of the first network packet type is a plurality of IPv6 network packets such as IPv6 network packets 92, and the network packet of the second network packet type is an IPv4 network packet such as IPv4 network packet 80.

The following examples may illustrate one or more aspects of the disclosure.

Example 1. A method comprising: receiving, by a network device from a first network, a network packet of a first network packet type that encapsulates a fragment of a second network packet of a second network packet type, wherein the network packet is part of a flow of a plurality of network packets of the first network packet type that encapsulates fragments of the second network packet, and wherein the network packet includes a flow label that indicates a destination port for the second network packet; in response to receiving the network packet, performing, by the network device, an anti-spoof check on the fragment of the second network packet based at least in part on the destination port for the second network packet that is indicated by the flow label; and based on the fragment of the second network packet passing the anti-spoof check, forwarding, by the network device, the fragment of the second network packet to a second network.

Example 2. The method of Example 1, wherein: the network device has not received any fragments of the second network packet that includes an indication of the destination port for the second network packet; and the fragment of the second network packet encapsulated by the network packet does not include the indication of the destination port for the second network packet.

Example 3. The method of Example 1, further comprising: receiving, by the network device, one or more additional network packets of the flow of the plurality of network packets that encapsulate one or more fragments of the second network packet; in response to receiving each respective network packet of the one or more additional network packets, performing, by the network device, a respective anti-spoof check on a respective fragment of the second network packet encapsulated by the respective network packet based at least in part on the destination port for the second network packet that is indicated by a respective flow label of the respective network packet; and based on the respective fragment of the second network packet passing the respective anti-spoof check, forwarding, by the network device, the respective fragment of the second network packet to the second network.

Example 4. The method of Example 1, wherein the flow label comprises an indication of the destination port for the second network packet and an entropy value.

Example 5. The method of Example 4, wherein the flow label comprises an encrypted destination port, further comprising: decrypting, by the network device, the encrypted destination port to determine the destination port for the second network packet.

Example 6. The method of Example 1, wherein: the first network is an Internet Protocol version 6 (IPv6) network; the second network is an Internet Protocol version 4 (IPv4) network; the network packet of the first network packet type is an IPv6 network packet; and the second network packet of the second network packet type is an IPv4 network packet.

Example 7. A network device comprising: one or more network interfaces configured to receive, from a first network, a network packet of a first network packet type that encapsulates a fragment of a second network packet of a second network packet type, wherein the network packet is part of a flow of a plurality of network packets of the first network packet type that encapsulates fragments of the second network packet, and wherein the network packet includes a flow label that indicates a destination port for the second network packet; and processing circuitry configured to: in response to receiving the network packet, perform an anti-spoof check on the fragment of the second network packet based at least in part on the destination port for the second network packet that is indicated by the flow label; wherein the one or more network interfaces are further configured to, based on the fragment of the second network packet passing the anti-spoof check, forward the fragment of the second network packet to a second network.

Example 8. The network device of Example 7, wherein: the network device has not received any fragments of the second network packet that includes an indication of the destination port for the second network packet; and the fragment of the second network packet encapsulated by the network packet does not include the indication of the destination port for the second network packet.

Example 9. The network device of Example 7, wherein: the one or more network interfaces are further configured to receive one or more additional network packets of the flow of the plurality of network packets that encapsulate one or more fragments of the second network packet; the processing circuitry is further configured to, in response to receiving each respective network packet of the one or more additional network packets, perform a respective anti-spoof check on a respective fragment of the second network packet encapsulated by the respective network packet based at least in part on the destination port for the second network packet that is indicated by a respective flow label of the respective network packet; and the one or more network interfaces are further configured to, based on the respective fragment of the second network packet passing the respective anti-spoof check, forward the respective fragment of the second network packet to the second network.

Example 10. The network device of Example 7, wherein the flow label comprises an indication of the destination port for the second network packet and an entropy value.

Example 11. The network device of Example 10, wherein: the flow label comprises an encrypted destination port; and the processing circuitry is further configured to decrypt the encrypted destination port to determine the destination port for the second network packet.

Example 12. The network device of Example 7, wherein: the first network is an Internet Protocol version 6 (IPv6) network; the second network is an Internet Protocol version 4 (IPv4) network; the network packet of the first network packet type is an IPv6 network packet; and the second network packet of the second network packet type is an IPv4 network packet.

Example 13. A method comprising: receiving, by a network device from a second network, a network packet of a second network packet type; fragmenting, by the network device, the network packet into a plurality of fragments of the network packet; encapsulating, by the network device, the plurality of fragments of the network packet with a plurality of network packets of a first network packet type, including creating, for each of the plurality of network packets, a flow label that indicates a destination port of the network packet; and forwarding, by the network device, the plurality of network packets to a first network.

Example 14. The method of Example 13, wherein creating, for each of the plurality of network packets, the flow label that indicates the destination port of the network packet comprises: creating, by the network device the flow label that includes an entropy value and an indication of the destination port of the network packet.

Example 15. The method of Example 13, wherein creating, for each of the plurality of network packets, the flow label that indicates the destination port of the network packet comprises: encrypting, by the network device, the destination port of the network packet to generate an encrypted destination port of the network packet; and creating, by the network device, for each of the plurality of network packets, the flow label that includes the encrypted destination port.

Example 16. The method of Example 13, wherein creating, for each of the plurality of network packets, the flow label that indicates the destination port of the network packet comprises: creating, for each of the plurality of network packets, the flow label that includes an entropy value.

Example 17. The method of Example 13, wherein: the first network is an Internet Protocol version 6 (IPv6) network; the second network is an Internet Protocol version 4 (IPv4) network; the plurality of network packets of the first network packet type is a plurality of IPv6 network packets; and the network packet of the second network packet type is an IPv4 network packet.

Example 18. A network device comprising: one or more network interfaces configured to receive, from a second network, a network packet of a second network packet type; and processing circuitry configured to: fragment the network packet into a plurality of fragments of the network packet; and encapsulate the plurality of fragments of the network packet with a plurality of network packets of a first network packet type, including creating, for each of the plurality of network packets, a flow label that indicates a destination port of the network packet; wherein the one or more network interfaces are further configured to forward the plurality of network packets to a first network.

Example 19. The network device of Example 18, wherein to create, for each of the plurality of network packets, the flow label that indicates the destination port of the network packet, the processing circuitry is further configured to create the flow label that includes an entropy value and an indication of the destination port of the network packet.

Example 20. The network device of Example 18, wherein to create, for each of the plurality of network packets, the flow label that indicates the destination port of the network packet, the processing circuitry is further configured to: encrypt the destination port of the network packet to generate an encrypted destination port of the network packet; and create, for each of the plurality of network packets, the flow label that includes the encrypted destination port.

Example 21. The network device of Example 18, wherein to create, for each of the plurality of network packets, the flow label that indicates the destination port of the network packet, the processing circuitry is further configured to create, for each of the plurality of network packets, the flow label that includes an entropy value.

Example 22. The network device of Example 18, wherein: the first network is an Internet Protocol version 6 (IPv6) network; the second network is an Internet Protocol version 4 (IPv4) network; the plurality of network packets of the first network packet type is a plurality of IPv6 network packets; and the network packet of the second network packet type is an IPv4 network packet.

The techniques described in this disclosure may be implemented, at least in part, in hardware, software, firmware or any combination thereof. For example, various aspects of the described techniques may be implemented within processing circuitry, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

The invention claimed is:

1. A method comprising:
receiving, by a network device from a first network, a network packet of a first network packet type that encapsulates a fragment of a second network packet of a second network packet type as a payload of the network packet, wherein the network packet is part of a flow of a plurality of network packets of the first network packet type that encapsulates fragments of the second network packet, and wherein the network packet includes an extension header that indicates a source port for the second network packet and a destination port for the second network packet;
in response to receiving the network packet, performing, by the network device, an anti-spoof check on the fragment of the second network packet based at least in part on at least one of: the source port for the second network packet that is indicated by the extension header or the destination port for the second network packet that is indicated by the extension header; and
based on the fragment of the second network packet passing the anti-spoof check, forwarding, by the network device, the fragment of the second network packet to a second network.

2. The method of claim 1, wherein:
the network device has not received, prior to receiving the network packet, any fragments of the second network packet that includes an indication of the source port for the second network packet or an indication of the destination port for the second network packet; and
the fragment of the second network packet encapsulated by the network packet does not include the indication of the source port for the second network packet and does not include the indication of the destination port for the second network packet.

3. The method of claim 1, further comprising:
receiving, by the network device, one or more additional network packets of the flow of the plurality of network packets that encapsulate one or more fragments of the second network packet;
in response to receiving each respective network packet of the one or more additional network packets, performing, by the network device, a respective anti-spoof check on a respective fragment of the second network packet encapsulated by the respective network packet based on at least one of: the source port for the second network packet that is indicated by a corresponding extension header of the respective network packet or the destination port for the second network packet that is indicated by the corresponding extension header of the respective network packet; and
based on the respective fragment of the second network packet passing the respective anti-spoof check, forwarding, by the network device, the respective fragment of the second network packet to the second network.

4. The method of claim 1, wherein the extension header comprises a destination options header that includes a metadata options field that stores the source port for the second network packet and the destination port for the second network packet.

5. The method of claim 4, wherein the metadata options field includes a first set of type-length-value fields for storing the source port for the second network packet and a second set of type-length-value fields for storing the destination port for the second network packet.

6. The method of claim 1, wherein:
the first network is an Internet Protocol version 6 (IPv6) network;
the second network is an Internet Protocol version 4 (IPv4) network;
the network packet of the first network packet type is an IPv6 network packet; and
the second network packet of the second network packet type is an IPv4 network packet.

7. A network device comprising:
one or more network interfaces configured to receive, from a first network, a network packet of a first network packet type that encapsulates a fragment of a second network packet of a second network packet type as a payload of the network packet, wherein the network packet is part of a flow of a plurality of network packets of the first network packet type that encapsulates fragments of the second network packet, and wherein the network packet includes an extension header that indicates a source port for the second network packet and a destination port for the second network packet; and
processing circuitry configured to:
in response to receiving the network packet, perform an anti-spoof check on the fragment of the second network packet based at least in part on the destination port for the second network packet that is indicated by the extension header;
wherein the one or more network interfaces are further configured to, based on the fragment of the second network packet passing the anti-spoof check, forward the fragment of the second network packet to a second network.

8. The network device of claim 7, wherein:
the network device has not received prior to receiving the network packet, any fragments of the second network packet that includes an indication of the source port for the second network packet; and
the fragment of the second network packet encapsulated by the network packet does not include the indication of the source port for the second network packet and does not include the indication of the destination port for the second network packet.

9. The network device of claim 7, wherein:
the one or more network interfaces are further configured to receive one or more additional network packets of the flow of the plurality of network packets that encapsulate one or more fragments of the second network packet;
the processing circuitry is further configured to, in response to receiving each respective network packet of the one or more additional network packets, perform a respective anti-spoof check on a respective fragment of the second network packet encapsulated by the respective network packet based at least in part on the source port for the second network packet that is indicated by a corresponding extension header of the respective network packet; and the one or more network interfaces are further configured to, based on the respective fragment of the second network packet passing the respective anti-spoof check, forward the respective fragment of the second network packet to the second network.

10. The network device of claim 7, wherein the extension header comprises a destination options header that includes a metadata options field that stores the source port for the second network packet.

11. The network device of claim 10, wherein the metadata options field further stores a destination port for the second network packet.

12. The network device of claim 11, wherein the metadata options field includes a first set of type-length-value fields for storing the source port for the second network packet and a second set of type-length-value fields for storing the destination port for the second network packet.

13. The network device of claim 7, wherein:
the first network is an Internet Protocol version 6 (IPv6) network;
the second network is an Internet Protocol version 4 (IPv4) network;
the network packet of the first network packet type is an IPv6 network packet; and
the second network packet of the second network packet type is an IPv4 network packet.

14. A method comprising:
encapsulating, by a network device, a plurality of fragments of a network packet of a second network type with a plurality of network packets of a first network packet type, including encapsulating a transport header of the network packet in only one of the plurality of network packets and creating, for each of the plurality of network packets, an extension header that indicates a source port for the network packet of the second network type and a destination port for the network packet of the second network type; and forwarding, by the network device, the plurality of network packets to a first network.

15. The method of claim 14, further comprising:
receiving, by the network device and from a second network, the network packet of the second network packet type; and fragmenting, by the network device, the network packet into the plurality of fragments of the network packet.

16. The method of claim 14, further comprising:
receiving, by the network device and from a second network, the plurality of fragments of the network packet of the second network packet type.

17. The method of claim 14, wherein the extension header comprises a destination options header that includes a metadata options field that stores the source port for the network packet of the second network type and the destination port for the network packet of the second network type.

18. The method of claim 17, wherein the metadata options field includes a first set of type-length-value fields for storing the source port for the second network packet and a second set of type-length-value fields for storing the destination port for the second network packet.

19. The method of claim 15, wherein:
the first network is an Internet Protocol version 6 (IPv6) network;
the plurality of network packets of the first network packet type is a plurality of IPv6 network packets; and
the network packet of the second network packet type is an Internet Protocol version 4 (IPv4) network packet.

* * * * *